United States Patent
Takayama et al.

(10) Patent No.: US 8,335,052 B2
(45) Date of Patent: Dec. 18, 2012

(54) PLASMON ANTENNA FOR THERMALLY ASSISTED MAGNETIC HEAD

(75) Inventors: Seiichi Takayama, Tokyo (JP); Eiji Komura, Tokyo (JP); Yasuhiro Ito, Tokyo (JP); Kosuke Tanaka, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1106 days.

(21) Appl. No.: 12/237,767

(22) Filed: Sep. 25, 2008

(65) Prior Publication Data
US 2010/0073817 A1   Mar. 25, 2010

(51) Int. Cl.
*G11B 5/127*   (2006.01)
(52) U.S. Cl. .................................. 360/125.31; 385/129
(58) Field of Classification Search ............. 360/59, 360/125.31, 125.74, 128; 369/13.33, 13.13, 369/13.32, 13.02, 112.09, 112.14, 112.21, 369/112.27; 385/129, 31, 88–94
See application file for complete search history.

(56) References Cited

U.S. PATENT DOCUMENTS

| 5,696,372 A | 12/1997 | Grober et al. |
| 6,649,894 B2 | 11/2003 | Matsumoto et al. |
| 7,177,236 B2 | 2/2007 | Harchanko et al. |
| 2009/0168220 A1 * | 7/2009 | Komura et al. ............... 360/59 |

FOREIGN PATENT DOCUMENTS

JP    A-2006-185548    7/2006

\* cited by examiner

*Primary Examiner* — Joseph Feild
*Assistant Examiner* — Gustavo Polo
(74) *Attorney, Agent, or Firm* — Oliff & Berridge, PLC

(57) ABSTRACT

A plasmon antenna of the present invention is used in a thermally assisted magnetic head that includes: a medium-facing surface set, parallel to an XY plane; a magnetic pole for writing, extending toward the medium-facing surface, and a plasmon antenna comprising a pair of small metal bodies irradiated with excitation light for near-field light generation propagating in a Z-axis direction. Respective corners of the small metal bodies are spaced apart opposite each other along a TE mode direction of the excitation light. A distance between the corners gives the shortest distance between the small metal bodies, and a distance from each corner to the leading end of the magnetic pole gives a shortest distance from the small metal bodies to the leading end.

22 Claims, 34 Drawing Sheets

*Fig.8*

| G1(nm) | PEAK COUNT | HALF WIDTH A (nm) | PEAK ELECTROMAGNETIC FIELD INTENSITY $D_{MP}(V/m)^2$ | ELECTROMAGNETIC FIELD DENSITY $D_{DMP}=(D_{MP}/A^2)$ $(V/m)^2/(nm)^2$ |
|---|---|---|---|---|
| 5 | 1 | 9 | 703 | 8.7 |
| 10 | 1 | 18 | 1131 | 3.5 |
| 15 | 2 | 25 | 908 | 1.5 |
| 20 | 2 | 32 | 380 | 0.4 |

PLASMON ANTENNA FOR THERMALLY ASSISTED MAGNETIC HEAD

BACKGROUND OF THE INVENTION

1. Field of the Invention

The present invention relates to a plasmon antenna for a thermally assisted magnetic head used in a magnetic recording device such as a hard disk drive.

2. Related Background Art

Thermally assisted magnetic recording has been the object of ongoing research in recent years with a view to enhancing magnetic recording density. To write information in thermally assisted magnetic recording, a magnetic head applies a magnetic field on a region to be recorded on, in the magnetic recording medium, while the region is heated. The plasmon antennas used for such heating exhibit plasmon resonance, generating near-field light as a result, when irradiated by a laser beam. Specifically, a laser beam propagates through an optical waveguide and strikes a plasmon antenna provided at the leading end of the optical waveguide.

The laser beam comprises a TM (transverse magnetic) polarized component and a TE (Transverse electric) polarized component. To operate the plasmon antenna with a TM-polarized component, two conceivable methods are 1) a method in which a laser beam from a TM-polarized laser light source strikes the plasmon antenna directly, and 2) a method in which a laser beam from a TE-polarized laser light source is converted to TM polarization via a polarization mode converter, and strikes then the plasmon antenna. When the leading end vertex of a triangular antenna is disposed in the track running direction of the magnetic recording medium, the orientation of a perpendicular line drawn from the vertex of the triangle to the base thereof preferably coincides with the TM mode direction.

In the former method 1), however, it is difficult to manufacture good TM-polarized laser light sources, while energy conversion efficiency is poor. Such a method is thus inadequate for near-field light generation. The latter method 2) utilizes a polarization mode converter, which is disadvantageous both in terms of cost and of transmission loss during polarization mode conversion. Moreover, the conversion efficiency of the polarization mode converter is of about 80% at best. The development of plasmon antennas that work with TE polarization holds thus great promise.

Conventional plasmon antennas are disclosed in, for instance, U.S. Pat. No. 5,696,372, 7,177,236 or 6,649,894, which disclose bow-tie plasmon antennas. The plan-view shape of a conventional bow-tie plasmon antenna comprises a set of small metal films, shaped as isosceles triangles, wherein the vertices of the small metal films oppose each other with a gap in between In plasmon antennas having such a structure, near-field light is generated at the position of the gap.

The structure of conventional plasmon antennas, however, may preclude carrying out sufficient writing. Specifically, the inventors have found, as a result of diligent research, that in a conventional structure the position of a magnetic pole that applies a write magnetic field is spaced apart from the position of the gap at which near-field light is generated, which is problematic owing to the difficulty of applying the write magnetic field before the magnetic recording medium cools down after having been heated by the near-field light.

SUMMARY OF THE INVENTION

In order to solve the above problems, the plasmon antenna of the present invention is a plasmon antenna for a thermally assisted magnetic head, comprising: a medium-facing surface, set parallel to an XY plane; a magnetic pole for writing, extending toward the medium-facing surface; and a plasmon antenna comprising a pair of small metal bodies irradiated with excitation light for near-field light generation propagating in a Z-axis direction, wherein respective corners of the small metal bodies are spaced apart opposite each other along a track width direction of a magnetic recording medium, and wherein a distance G1 between the corners gives the shortest distance between the small metal bodies, and a distance D from each corner to the leading end of the magnetic pole gives a shortest distance from the small metal bodies to the leading end.

Preferably, the plan-view shape of each small metal body, as viewed from the Z-axis direction, is a trapezoid, and the upper bases of the respective trapezoids form each one side of the corners that give the distance G1. The plan-view shape of each small metal body, as viewed from the Z-axis direction, may be a parallelogram. Also, each small metal body may comprise a small metal body main section, and a metal body extension contiguous to the small metal body main section. When the small metal bodies have such a plan-view shape (trapezoid, parallelogram and so forth) in which sides positioned on the side of a magnetic pole extend linearly, the small metal bodies can be brought closer to the magnetic pole than is the case in the plasmon antenna of U.S. Pat. No. 6,649,894.

In particular, the above constitution allows the distance D to range between 5 nm to 300 nm, which in turns allows applying a sufficient write magnetic field before the magnetic recording medium cools down.

In the above constitution, the corners of the small metal bodies are disposed at a position that is closest to the magnetic pole. The magnetic recording medium is then heated by near-field light generated at the gap between the small metal bodies in response to irradiation of excitation light onto the plasmon antenna. Since the position of the gap stands close to the position of the leading end of the magnetic pole, information can be written on the magnetic recording medium, via the magnetic pole, before the magnetic recording medium cools down. Sufficient thermally assisted magnetic recording can be carried out thereby, which allows hence increasing recording density.

Preferably, the dimension of each small metal body alongside the corners in the Y-axis is larger than a predefined value. That is, a region of finite surface area extends preferably from the corners along the Y-axis direction, so that metal atoms vibrate resonantly in the TE mode direction (Y-axis). Herein, the dimension of each small metal body alongside the corners in the Y-axis is larger than a predefined value, and hence the plasmon antenna can resonate with the TE mode excitation light. The TE mode direction of the excitation light is the track width direction of the magnetic recording medium.

Preferably, the distance G1 between the small metal bodies is smaller than 15 nm, in which case the intensity of near-field light is enhanced more than when the distance G1 is 20 nm.

More preferably, the distance G1 between the small metal bodies is not greater than 10 nm, in which case the intensity of near-field light is further enhanced than when the distance G1 is 15 nm.

The small metal bodies can comprise Au or Ag. Plasmon resonance is observed in simulations using these metals, but other metals may be used as the small metal bodies.

The thermally assisted magnetic head according to the present invention comprises the above magnetic pole and plasmon antenna comprising small metal bodies, a coil for causing magnetic flux to pass through the magnetic pole; and a core through which the excitation light propagates. Near-field light can thus provide sufficient heating during information writing by the magnetic pole, driven by the coil, and hence the thermally assisted magnetic head of the present invention enables thus high-density magnetic recording.

The thermally assisted magnetic head according to the present invention ether comprises a magnetoresistance effect element (MR element) disposed at a position such that the above-described corners are flanked by the magnetoresistance effect element and the magnetic pole. The thermally assisted magnetic head comprises thus a MR element, whereby information written in the magnetic recording medium can be read as well.

The hard disk drive according to the present invention comprises a head gimbal assembly on which the above thermally assisted magnetic head is mounted, and a magnetic recording medium opposing the thermally assisted magnetic head. The magnetic head in this hard disk drive can carry out high-density magnetic recording, which allows increasing the storage capacity of the hard disk drive.

A plasmon antenna manufacturing method according to the present invention comprises the steps of (a) forming a protrusion formed of a waveguide material on a substrate; (b) covering the substrate and the protrusion with a metal film; and (c) forming a plasmon antenna comprising a pair of small metal bodies, by separating the covering metal film by flat lapping the metal film until the protrusion is exposed. When the magnetic pole is formed thus above the protrusion, the corners of the small metal bodies can be disposed at a position closest to the magnetic pole, as is the case above.

Also, a plasmon antenna manufacturing method according to the present invention comprises the steps of (a) forming a protrusion formed of a waveguide material on a substrate; (b) covering the substrate and the protrusion with a metal film; and (c) forming a plasmon antenna comprising a pair of small metal bodies, by dividing the covering metal film through milling thereof while rotating the substrate around an axis that runs along the thickness direction of the substrate. In addition to the above effects, these methods effectively simplify manufacture of the plasmon antenna.

Preferably, the lapping step is terminated before the shortest distance between the pair of small metal bodies formed by the divided metal film becomes 15 nm or greater, more preferably before the shortest distance becomes greater than 10 nm. This way the distance G1 of the above-described gap can measure less than 15 nm, or not more than 10 nm, which allows increasing near-field light intensity.

BRIEF DESCRIPTION OF THE DRAWINGS

FIG. 8 is a table listing the data of the graph illustrated in FIG. 7.

DESCRIPTION OF THE PREFERRED EMBODIMENTS

Figure 1:
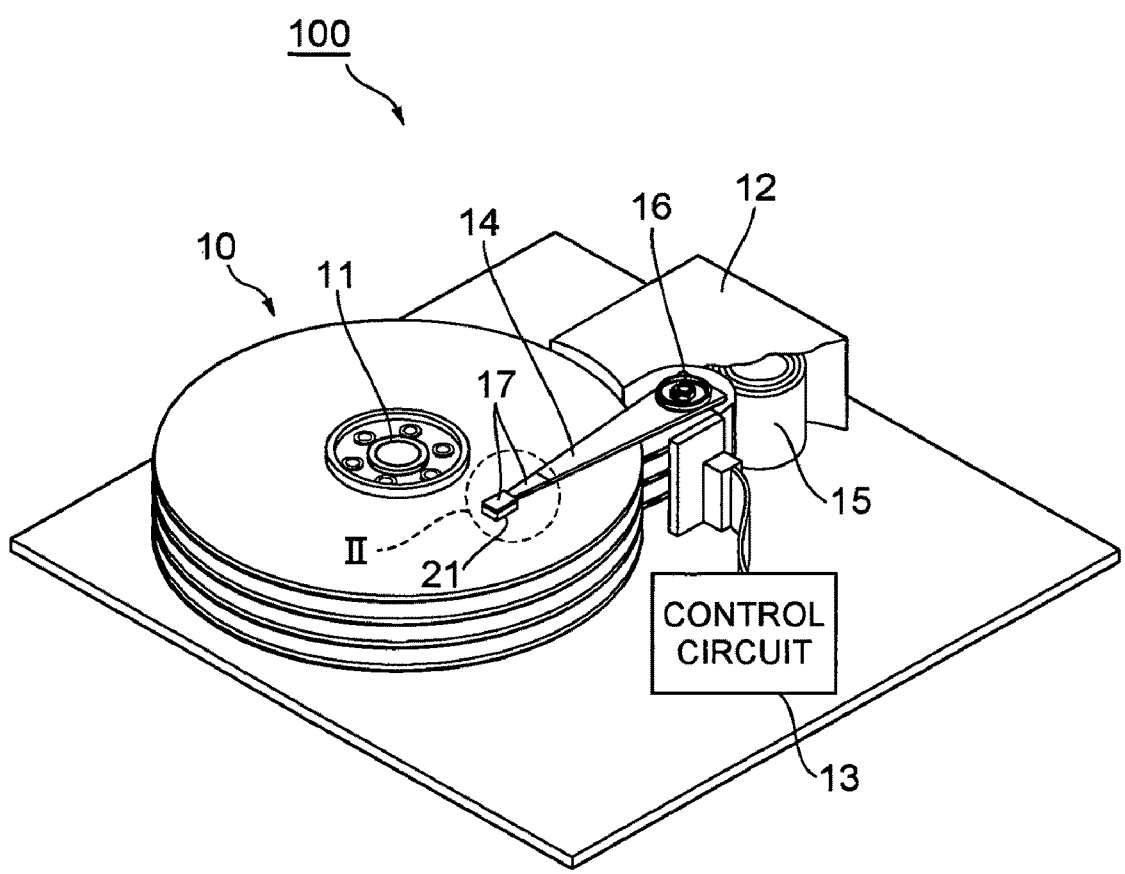
FIG. 1 is a perspective-view diagram of a hard disk drive.

Embodiments of a plasmon antenna comprising small metal bodies, and of a thermally assisted magnetic head and a hard disk drive, are explained next. In the drawings, identical elements are denoted with identical reference numerals, and recurrent explanations thereof are omitted.

FIG. 1 is a perspective-view diagram of a hard disk drive comprising a thermally assisted magnetic head according to the present embodiment. The XYZ orthogonal coordinate system is set as in the figure.

A hard disk drive 100 comprises magnetic disks 10, as a plurality of magnetic recording media that rotate around a rotation shaft of a spindle motor 11; an assembly carriage device 12 for positioning a thermally assisted magnetic head 21 on a track; and a recording, reproduction, and emission control circuit (control circuit) 13 for controlling writing and reading operations of the thermally assisted magnetic head 21, and for controlling a semiconductor laser element (laser diode), as a light source for emitting a laser beam (excitation light), for thermally assisted magnetic recording.

The assembly carriage device 12 is provided with a plurality of drive arms 14. These drive arms 14 are rockable around a pivot bearing shaft 16 by a voice coil motor (VCM) 15, and are stacked in the direction along this shaft 16. A head gimbal assembly (HGA) 17 is attached to the leading end of each drive arm 14. Therefore, the HGAs 17 are rockable, relative to the magnetic disks 10, around the pivot bearing shaft 16. Each HGA 17 is provided with a thermally assisted magnetic head 21 in such a manner that the latter faces the surface of each magnetic disk 10. The surface of the magnetic head 21 facing the surface of the magnetic disk 10 is a medium-facing surface S (which is also called an air bearing surface (ABS), see FIG. 2) of the thermally assisted magnetic head 21. The magnetic disks 10, drive arms 14, HGAs 17, and thermally assisted magnetic heads 21 may each be provided singly.

The hard disk drive 100 comprises thus HGAs 17 having thermally assisted magnetic heads 21 mounted thereon, and magnetic recording media facing the thermally assisted magnetic heads 21. In the hard disk drive 100, the thermally assisted magnetic heads 21 can generate high-intensity near-field light locally, whereby magnetic recording density and storage capacity can be increased dramatically.

Figure 2:
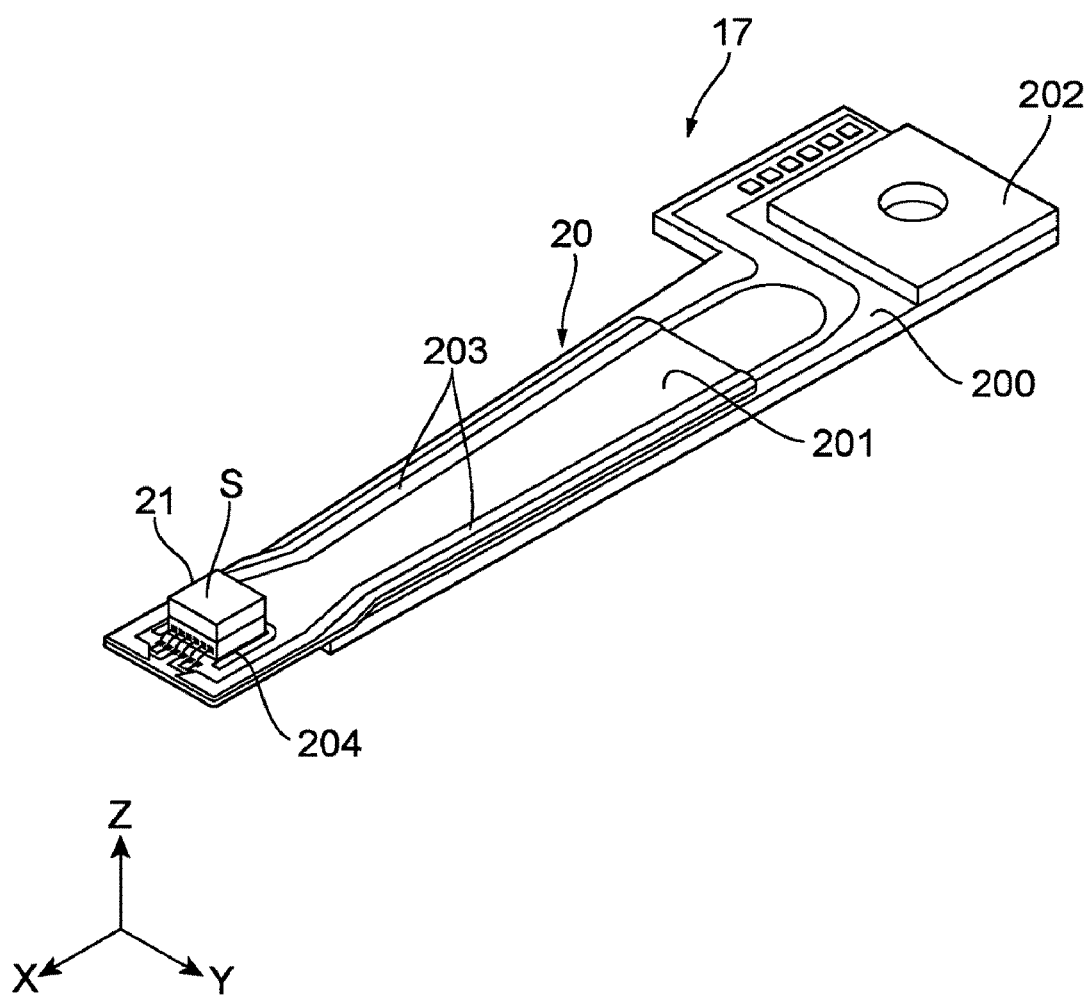
FIG. 2 is a perspective-view diagram of an HGA.

FIG. 2 is a perspective-view diagram of an HGA 17. In the figure, the medium-facing surface S of the HGA 17 is depicted facing upwards.

The HGA 17 is constructed by fixing the thermally assisted magnetic head 21 to a leading end of a suspension 20 and by electrically connecting one end of a wiring member 203 to terminal electrodes of the thermally assisted magnetic head 21. The suspension 20 comprises mainly a load beam 200, an elastic flexure 201 fixed and supported on the load beam 200, a tongue portion 204 formed in a plate spring shape at the tip of the flexure, a base plate 202 provided on the base of the load beam 200, and a wiring member 203 provided on the flexure 201 and comprising a lead conductor and connection pads electrically connected to the both ends of the lead conductor.

It is obvious that the structure of the suspension in the HGA 17 of the present invention is not limited to the above-described structure. Although not shown in the figure, an IC chip for head driving may be mounted midway in the suspension 20.

Figure 3:
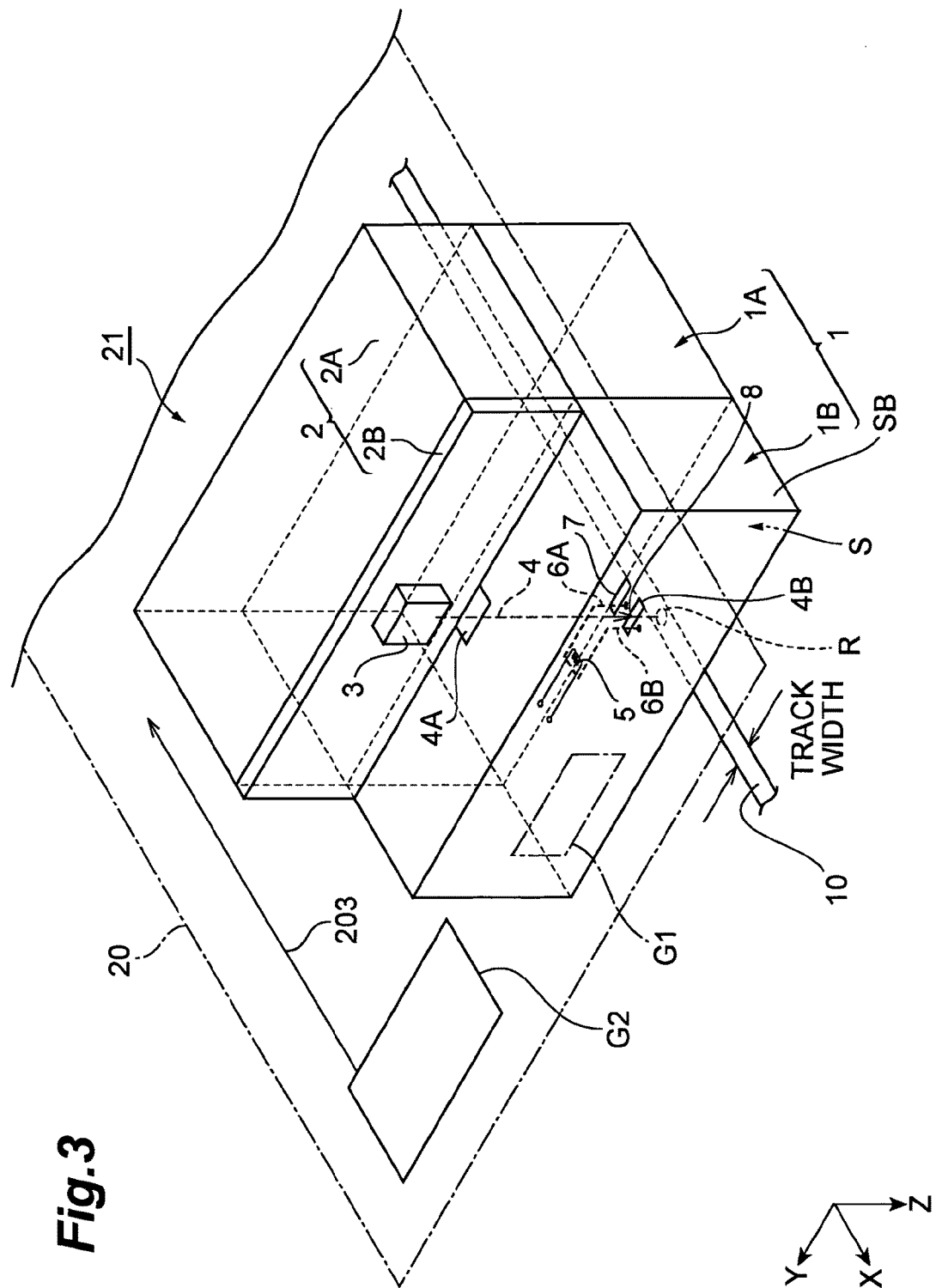
FIG. 3 is an enlarged perspective-view diagram of the vicinity of a thermally assisted magnetic head 21 illustrated in FIG. 1.

FIG. 3 is an enlarged perspective-view diagram of the vicinity of a thermally assisted magnetic head 21 illustrated in FIG. 1.

The thermally assisted magnetic head 21 is mounted on the leading end of the suspension 20. The thermally assisted magnetic head 21 comprises a slider 1 and a light source unit 2 bonded together. The slider 1 comprises a magnetic head portion 1B formed on the YZ plane of a slider substrate 1A. The XY plane of the magnetic head portion 1B, in the −Z direction, constitutes the medium-facing surface S. The light source unit 2 comprises an insulating layer 2B on the YZ plane of a light source support substrate 2A. A semiconductor laser element 3 is fixed to the insulating layer 2B, on the YZ plane.

The magnetic head portion 1B comprises a plurality of elements embedded in an insulator. Each of these elements comprises a coil 5 for generating a magnetic field through current supply; a main magnetic pole 6A extending from the center of the coil, for guiding the magnetic flux generated by the coil 5 up to the medium-facing surface S; and a auxiliary magnetic pole 6B for returning magnetic flux from the main magnetic pole 6A to the center of the coil 5. In addition, the elements comprise a magnetoresistive effect element (MR element) 7 having a magnetoresponsive surface exposed at the medium-facing surface S; and a core 4 of a waveguide extending in the Z-axis direction. The member around the core 4, which is a cladding comprising an insulator that makes up the greater part of the magnetic head portion 1B, constitutes a substrate SB that comprises an optical waveguide material. The core 4 may have various shapes. Accordingly, although herein the core 4 is depicted by a dotted line that joins a light incidence surface 4A and a light exit surface 4B, the core 4 may also be shaped, for instance, as a straight line.

The main magnetic pole 6A is exposed at the medium-facing surface S. However, the main magnetic pole 6A need not be exposed at the medium-facing surface S, provided that the main magnetic pole 6A is positioned in such a manner so as to be capable of applying a magnetic field towards a recording region R on the surface of the magnetic disk 10. The auxiliary magnetic pole 6B is provided in the vicinity of the main magnetic pole 6A. The magnetic field lines from the main magnetic pole 6A flow into the auxiliary magnetic pole 6B via the recording region R. The positional relationship between the main magnetic pole 6A and the auxiliary magnetic pole 6B can be embodied in a number of conceivable ways. Herein, the main magnetic pole 6A and the auxiliary magnetic pole 6B are arranged in such a manner that the light exit surface 4B is positioned therebetween. It is also possible to arrange the main magnetic pole at the position of the auxiliary magnetic pole 6B in the figure, disposing then the auxiliary magnetic pole at position further removed from the main magnetic pole, as viewed from the plasmon antenna 8. The leading end of a plasmon antenna (near-field light-emitting element) 8 is exposed at the light exit surface 4B. In the figure, the plasmon antenna 8 is indicated by the arrow positioned at the tip of the core 4.

The above-described core 4 comprises the light incidence surface 4A, onto which a beam from the semiconductor laser element 3 is incident, on the XY plane, in the negative direction of the Z-axis; and the light exit surface 4B on the XY plane, in the positive direction of the Z-axis, i.e. on the medium-facing surface S. In the present example, the semiconductor laser element 3 is an edge-emitting laser diode. A laser beam emitted through the end face, which is parallel to the XY plane, enters into the core 4 via the light incidence surface 4A, and strikes the plasmon antenna 8 that extends from the light exit surface 4B towards the interior of the core.

The plasmon antenna 8 resonates with the incident beam and generates near-field light that heats up the recording region R. Information is written onto the recording region R when the magnetic field lines from the main magnetic pole 6A enter the heated recording region R.

Figure 5:
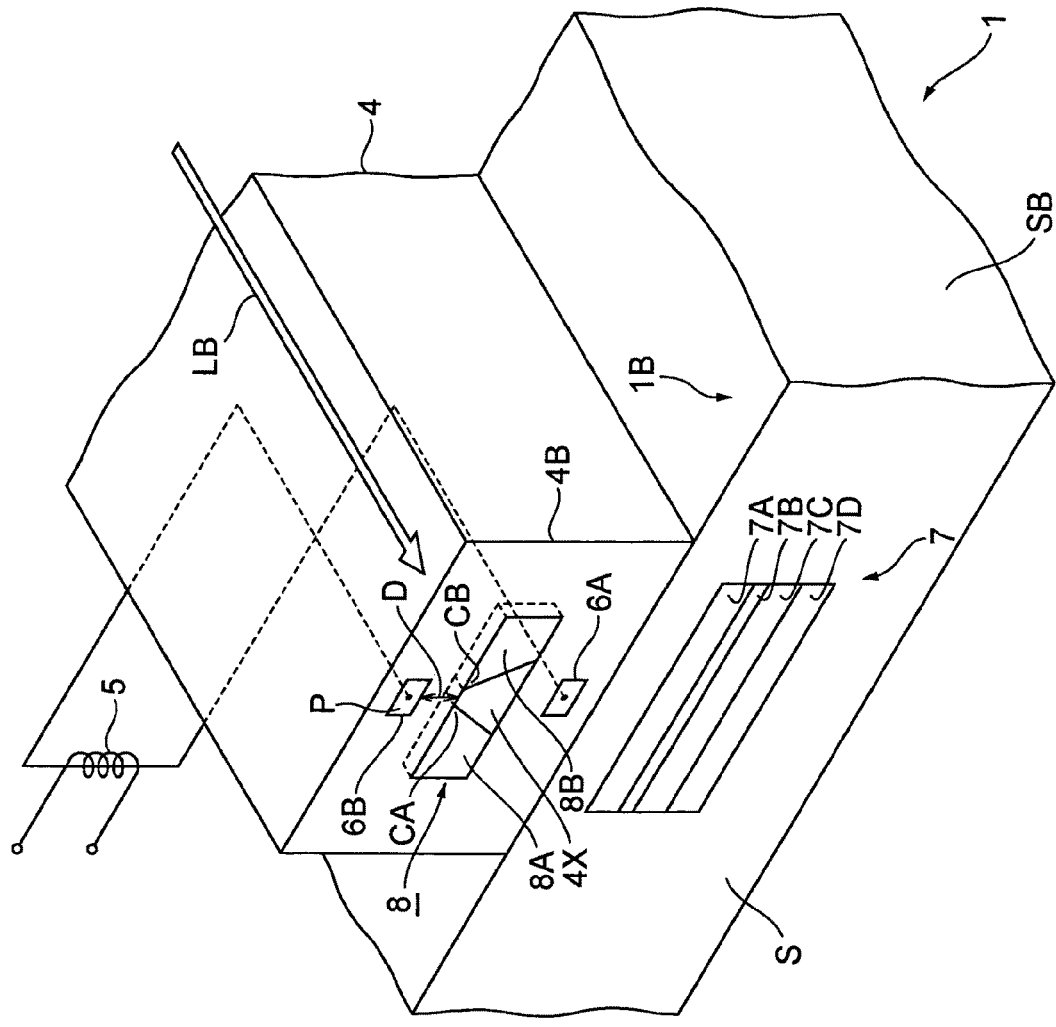
FIG. 5 is a perspective-view diagram of a characterizing portion of a thermally assisted magnetic head.

An electrode pad group G1, comprising a plurality of electrode pads, is formed on the YZ plane, in the positive direction of the X-axis, on the magnetic head portion 1B. The electrode pads are each connected to both ends of the coil 5 and to upper and lower electrodes of the MR element 7. As illustrated in FIG. 5, the MR element 7 comprises a stack of an antiferromagnetic layer 7D, a ferromagnetic layer 7C having the magnetization direction thereof fixed by an antiferromagnetic layer 7D, and a free layer 7A where the magnetization direction is deflected in response to the surrounding magnetic field. An interlayer 7B, comprising a non-magnetic layer or a tunnel barrier layer comprising an insulator, is interposed between the free layer 7A and the ferromagnetic layer 7C. Magnetoresistance varies in the MR element 7 in response to differences in the magnetization direction of the free layer 7A and the ferromagnetic layer 7C. A hard magnet, not shown, is disposed at both ends, in the Y-axis direction, of the free layer 7A. The structure of the MR element is not necessarily limited to the above-described one. Also, the operating characteristics of the MR element do not vary depending on the material thereof.

The electrode pads in the electrode pad group G1, which are connected to the two ends of the coil 5 and the upper and lower electrodes of the MR element 7, are electrically connected to that second electrode pad group G2 formed on the suspension 20, and to the exterior, via the wiring member 203. The second electrode pad group G2 connected to the wiring member 203 comprises also a pair of electrode pads for supplying driving current to the semiconductor laser element 3. The semiconductor laser element 3 emits light when driving current is caused to flow between these electrode pads.

The slider substrate 1A and the light source support substrate 2A comprise, for instance, alutic ($Al_2O_3$—TiC). When substrates having high thermal conductivity are used as the substrates 1A and 2A, the latter have a heat-dissipating function. The XY plane on the light source support substrate 2A is bonded to the rear face of the suspension 20, in the negative direction of the Z-axis.

The magnetic head portion 1B is formed by stacking the MR element 7, the cladding, the core 4, the coil 5, the main magnetic pole 6A and the auxiliary magnetic pole 6B along the X-axis. The stacking direction runs along the array direction of the recording region R within a track, the track width being parallel to the Y-axis.

As described above, the main magnetic pole 6A, as a magnetic recording element, is embedded in the light exit surface 4B of the optical waveguide (core). However, the main magnetic pole 6A may also be provided adjacent to the light exit surface 4B. The main magnetic pole 6A and the plasmon antenna 8 at the light exit surface 4B are disposed sufficiently close to each other so as to allow writing by the main magnetic pole 6A and the auxiliary magnetic pole 6B before the recording region R, having been heated by the plasmon antenna 8, cools down to its original temperature.

Figure 4:
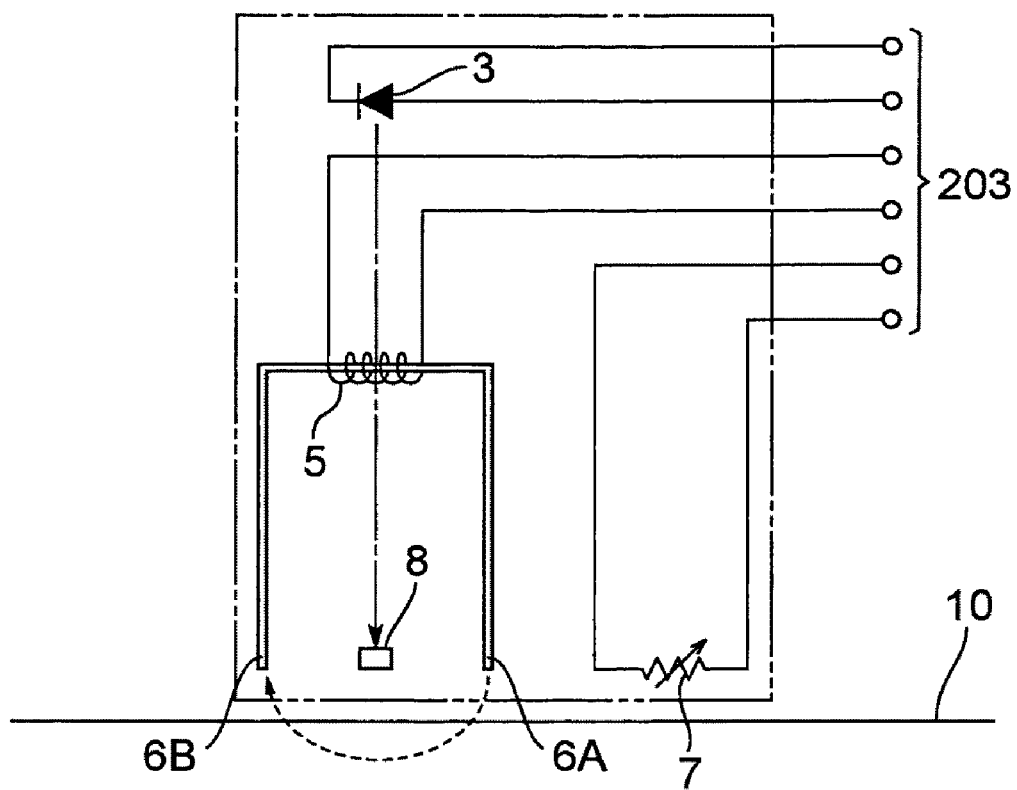
FIG. 4 is a circuit diagram of a thermally assisted magnetic head.

FIG. 4 is a circuit diagram of a thermally assisted magnetic head.

The magnetoresistance of the MR element 7 varies in response to the magnetic field generated around the recording region R of the magnetic disk 10 (see FIG. 3), whereupon there varies also the current flowing through the wiring member 203 connected to the MR element 7. The information written in the recording region R can thus be read by detecting this current.

During information writing, current is made to flow between both ends of the coil 5, from another wiring member 203. Thereupon, magnetic flux, as represented by a broken line in the figure, passes from the main magnetic pole 6A to the auxiliary magnetic pole 6B, and in doing so applies a write magnetic field to the surface region of the magnetic disk 10 between the main magnetic pole 6A and the auxiliary magnetic pole 6B. These magnetic recording elements are preferably perpendicular magnetic recording elements. The wiring member 203 supplies driving current to the semiconductor laser element 3, whereupon the latter emits a laser beam in synchrony with driving current supply.

The plasmon antenna 8 is disposed in the vicinity of the main magnetic pole 6A and the auxiliary magnetic pole 6B. As a result, the plasmon antenna 8 generates near-field light when irradiated by a laser beam from the semiconductor laser element 3. The magnetic recording region of the magnetic disk 10 is heated by the near-field light generated by the plasmon antenna 8 in response to laser beam irradiation, and receives the magnetic field from the main magnetic pole 6A, such that information is recorded on the basis of resulting changes in the magnetization of the magnetic recording region.

The structure of the plasmon antenna 8 is explained next.

FIG. 5 is a perspective-view diagram of a characterizing portion of a thermally assisted magnetic head.

The leading end of the plasmon antenna 8 is exposed at the medium-facing surface S. A laser beam LB from the semiconductor laser element propagates in the −Z direction through the core 4 of the optical waveguide, and strikes the plasmon antenna 8. A description of the cladding provided around the core 4 in FIG. 5 will be omitted. The plasmon antenna 8, which is formed on the light exit surface 4B of the core 4, comprises a pair of small metal bodies 8A, 8B.

The structure of the core 4, whose thickness coincides with the X-axis direction, is manufactured by forming an insulating section 4X as a protrusion on the YZ plane, which is the exposure surface of a lower core, and by depositing a metal layer on the insulating section 4X (FIG. 29A to FIG. 29C), followed by patterning of the plasmon antenna 8 through lapping until the insulating section 4X is exposed (FIG. 30A to FIG. 32C). An upper core is deposited then over the lower core in such a manner so as to cover the plasmon antenna 8, to yield the core 4.

The main magnetic pole 6A and the auxiliary magnetic pole 6B, disposed inside the core 4, extend up to the coil 5. Obviously, the positions of the main magnetic pole 6A and the auxiliary magnetic pole 6B may be swapped, as described above, although both magnetic poles remain magnetic poles for writing. The coil 5 is actually shaped as a flat spiral. The MR element 7 is disposed on an extension line along the thickness direction of the plasmon antenna 8, so that reading and writing can both be carried out on a same track. The insulating material in which the MR element 7 is embedded makes up a substrate SB. The MR element 7 is disposed at a position such that the corners CA, CB are flanked by the MR element 7 and the auxiliary magnetic pole 6B.

The above-described plasmon antenna 8 is used in a thermally assisted magnetic head comprising a magnetic pole 6B for writing, extending so as to face the medium-facing surface S, and the plasmon antenna 8, which comprises the pair of small metal bodies 8A, 8B that are irradiated with excitation light (laser light), for near-field light generation, propagating in the Z-axis direction. The respective corners CA, CB of the small metal bodies 8A, 8B are spaced apart opposite each other, along the TE mode direction (Y-axis direction) of the laser beam. The distance G1 (FIG. 6) between the corners CA, CB gives the shortest distance between the small metal bodies 8A, 8B. The distance D from the corners CA, CB to the leading end P of the auxiliary magnetic pole 6B gives the shortest distance between the small metal bodies 8A, 8B and the leading end P. The distance D ranges preferably from 5 nm to 300 nm. Such a range affords sufficient write magnetic field before the magnetic recording medium cools down.

When the Z-axis direction position of the leading end P of the auxiliary magnetic pole 6B is a position set back from the medium-facing surface S, or a position projecting out of the medium-facing surface S, the above distance is defined in detail as follows. Specifically, the distance D between the leading end P of the auxiliary magnetic pole 6B and the leading end position of the corners CA, CB, projected perpendicularly onto the XY plane that passes through the leading end P of the auxiliary magnetic pole 6B, is the shortest distance between the leading end P of the auxiliary magnetic pole 6B and the small metal bodies 8A, 8B projected perpendicularly on the XY plane.

In simpler words, the corners CA, CB of the small metal bodies 8A, 8B are disposed at a position that is closest to the auxiliary magnetic pole 6B. In the present example, the magnetic recording medium is heated by near-field light generated, at the gap between the small metal bodies 8A, 8B, through irradiation of a laser beam onto the plasmon antenna 8. The gap is positioned close to the position of the leading end P of the auxiliary magnetic pole 6B. As a result, information can be written on the magnetic recording medium, via the main magnetic pole 6A and the auxiliary magnetic pole 6B, before the magnetic recording medium cools down. Sufficient thermally assisted magnetic recording can be carried out thereby, which allows hence increasing recording density.

Figure 6:
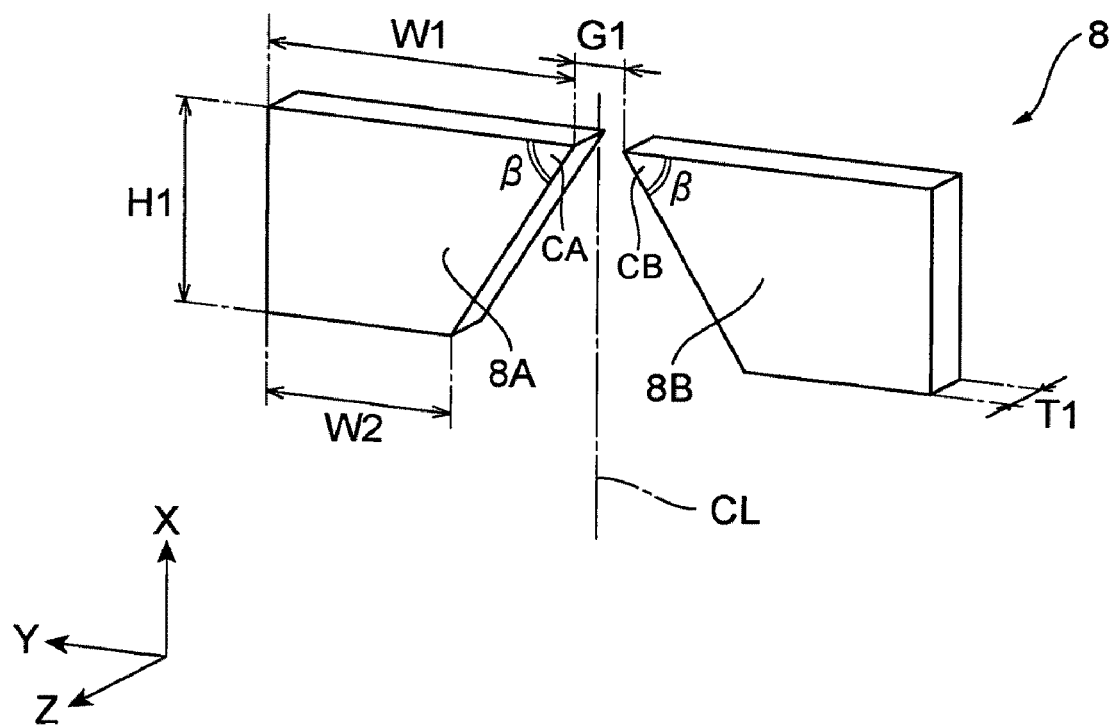
FIG. 6 is a perspective-view diagram of a plasmon antenna according to a first embodiment.

FIG. 6 is a perspective-view diagram of a plasmon antenna 8 according to a first embodiment.

The dimension W1 of the small metal bodies 8A, 8B, alongside the corners CA, CB in the Y-axis, is preferably greater than a predefined value. That is, a region of finite surface area extends from the corners CA, CB along the Y-axis direction, as a result of which metal atoms can vibrate resonantly in the TE mode direction (Y-axis). The value of W1 is, for instance, 80 nm. A preferred value of W1 may range from 40 nm to 120 nm.

The distance between the small metal bodies 8A, 8B is G1, which is also the distance between the corners CA, CB. The small metal bodies 8A, 8B have a trapezoidal shape, as viewed from the Z-axis direction (direction perpendicular to the medium-facing surface). The small metal body 8A is a trapezoid having an upper base of width W1, a lower base of width W2, a height H1 and a thickness T1 in the Z-axis direction. The upper base of the respective trapezoid constitutes one side of a respective corner CA, CB, which give the distance G1. The corner CA formed by the upper base and the oblique side of the plan-view shape of the small metal body 8A has an angle β. The angle β, which is an acute angle, ranges for instance from 30 degrees to 70 degrees. The shape of the pair of small metal bodies 8A, 8B is symmetrical relative to a centerline CL that runs parallel to the X-axis. Accordingly, a detailed explanation of the other small body 8B, a corner CB whereof has also the angle β, will be omitted.

Figure 7:
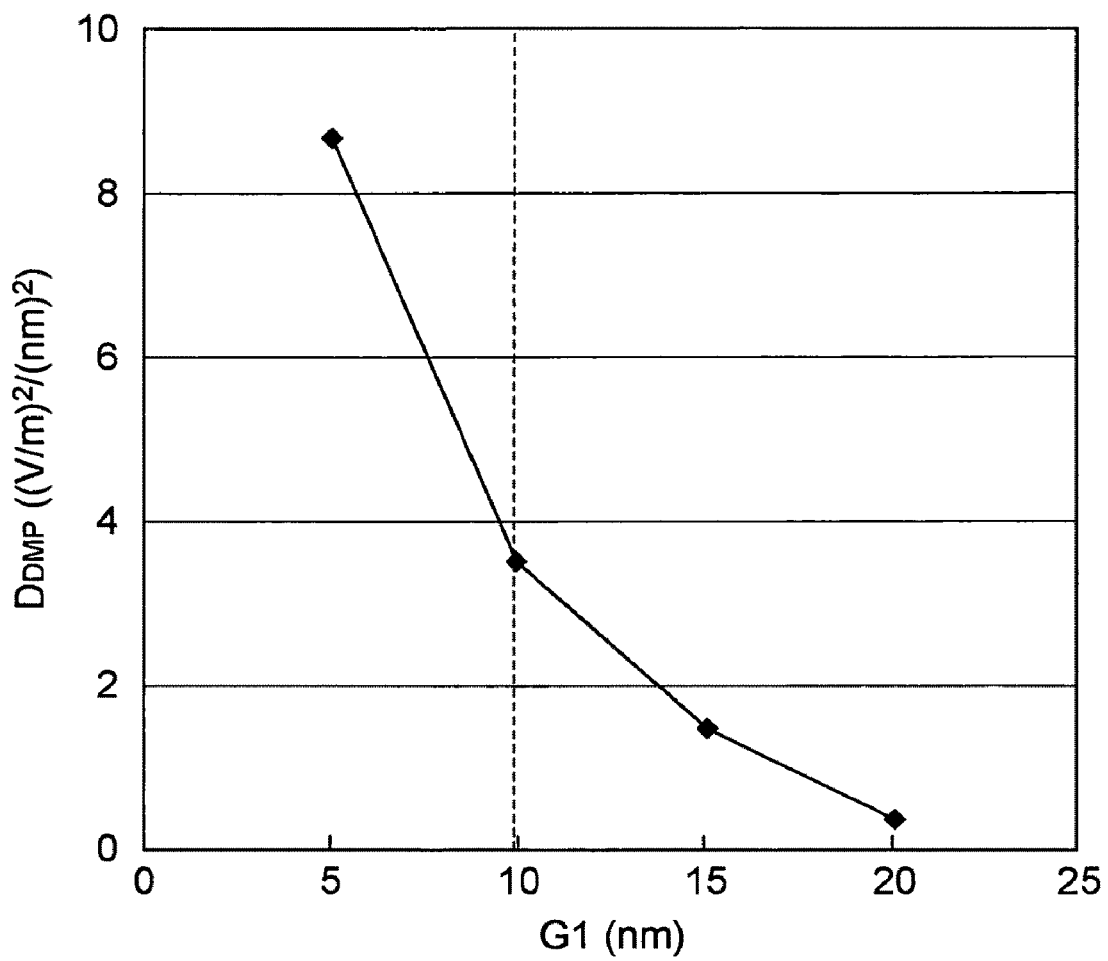
FIG. 7 is a graph illustrating the relationship between a distance G1 (nm) and electromagnetic field intensity DDMP $((V/m)^2/(nm)^2)$.

FIG. 7 is a graph illustrating the relationship between the distance G1 (nm) of the gap and electromagnetic field intensity DDMP $((V/m)^2/(nm)^2)$. FIG. 8 is a table listing the data of the graph illustrated in FIG. 7. The graphs are computed by 3D-FDTD (Three Dimensional Finite Differential Time Domain). In the computation, the material of the small metal bodies 8A, 8B is Au, the wavelength λ of the laser beam is 650 nm, and the substance surrounding the small metal bodies 8A, 8B is air. Other settings include W1=80 nm, W2=50 nm, H1=50 nm, T1=30 nm, β=59 degrees.

As the distance G1 is modified in the table of FIG. 8, there are observed various peaks in the Y-axis direction distribution of the intensity of the near-field light generated in the vicinity of the gap of the plasmon antenna 8. When the distance G1 is 15 nm or greater, there appear two peaks, while when the distance G1 is 10 nm or less, there appears one peak. The half width A (nm) of these intensity distribution spectra becomes narrower as the distance G1 decreases. The peak electromagnetic field intensity $D_{MP}$ (V/m)$^2$ of these intensity distribution spectra is large when the distance G1 is 10 nm, while the electromagnetic field density $D_{DMP}=(D_{MP}/A^2))$ [(V/m)$^2$/(nm)$^2$] increases dramatically as the distance G1 becomes shorter.

Returning to the graph of FIG. 7, it is observed that the electromagnetic field density $D_{DMP}$ increases abruptly as the distance G1 decreases. In particular, the peak count is 1 when the distance G1 is 10 nm or less. When the distance G1 is 15 m the peak count is 2, and hence it is inferred that the distance G1 at which the peak count switches over lies between 10 nm and 15 nm, for instance at 12 nm. When the peak count is 2, information is written at two sites, corresponding to respective peaks, during writing in the magnetic recording medium. As a result, accurate recording cannot be carried out, which is undesirable. By contrast, a peak count of 1 implies a single region in which information is written, whereby recording can be carried out accurately, which is advantageous.

As the above graph indicates, the distance G1 between the small metal bodies 8A, 8B is preferably smaller than 15 nm, in which case the intensity of near-field light is enhanced more than when the distance G1 is 20 nm.

More preferably, the distance G1 between the small metal bodies is not greater than 10 nm, in which case the intensity of near-field light is further enhanced than when the distance G1 is 15 nm. Also, the peak count is now 1, which enhances writing precision.

As explained above, the thermally assisted magnetic head, which comprises the plasmon antenna 8, the magnetic poles 6A, 6B, the coil 5 for causing magnetic flux to pass through the magnetic pole 6B, and the core 4 through which a laser beam (LB) propagates, as illustrated in FIG. 5, allows achieving sufficient heating, derived from near-field light, during writing of information by way of the magnetic poles 6A, 6B and the coil 5. The above-described thermally assisted magnetic head enables thus high-density magnetic recording.

An explanation follows next on the two-dimensional intensity distribution of near-field light, as determined on the basis of the above-described graph and tables. FIGS. 9 to 14 are diagrams illustrating the two-dimensional distribution of near-field light intensity in the vicinity of the gap of the plasmon antenna 8, as viewed from the side of laser beam irradiation. The pair of trapezoids depicted in the middle represents the outer contour of the plasmon antenna in the XY plane. FIGS. 15 to 19 are graphs illustrating the respective Y-axis distribution of the near-field light intensity illustrated in FIGS. 9 to 14. In FIGS. 15 to 19, the horizontal axis represents the position Y (nm) in the Y-axis direction, and the vertical axis represents the electromagnetic field intensity $D_M$ ($\times 10^3$ V/m)$^2$. The −20 nm position in the Y-axis is the position at which the leading end of the corner CB of the left-side small metal body 8B is located, as viewed from the laser beam irradiation direction.

Figure 9:
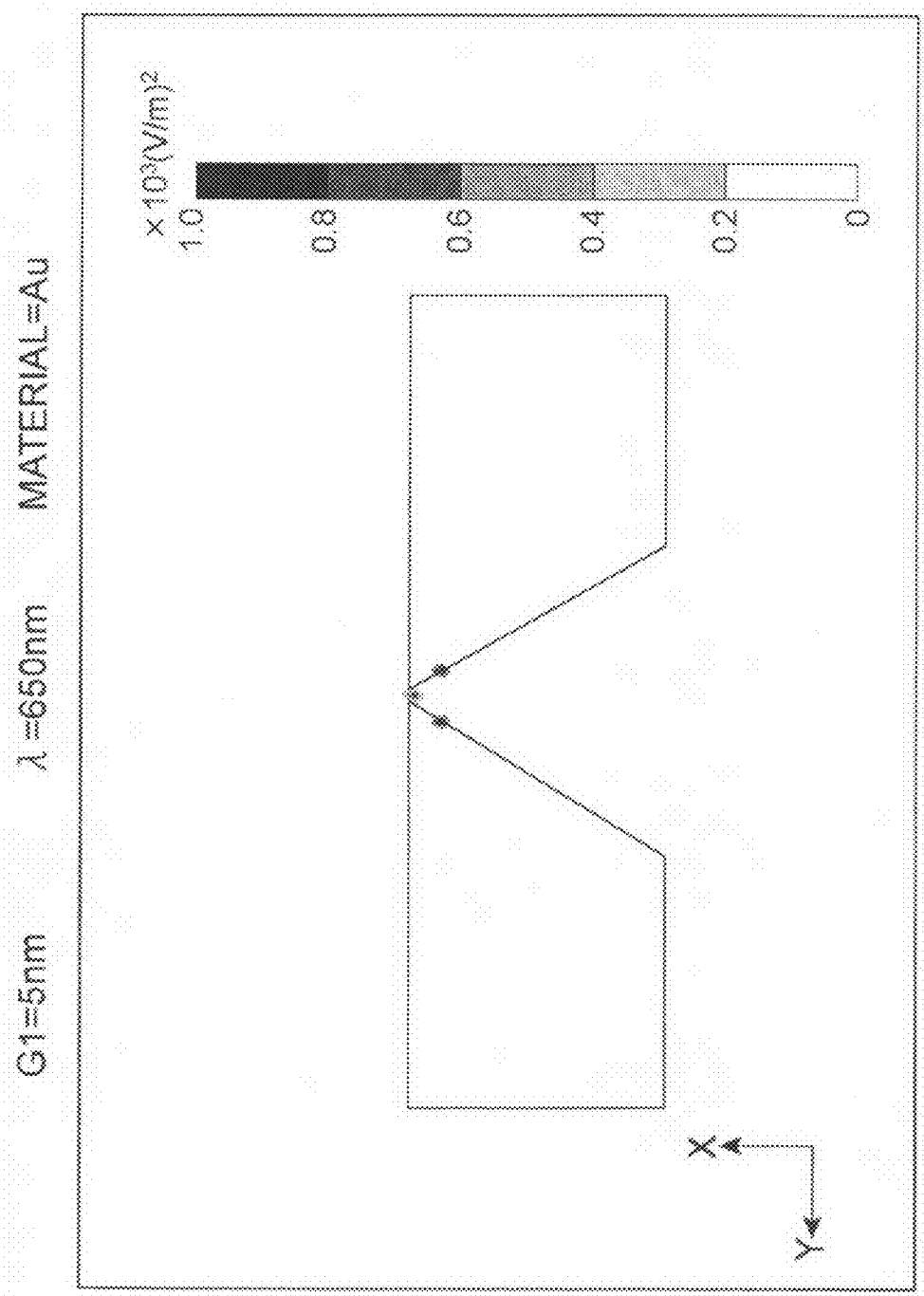
FIG. 9 is a diagram illustrating near-field light intensity distribution in the vicinity of a gap of a plasmon antenna.
Figure 15:
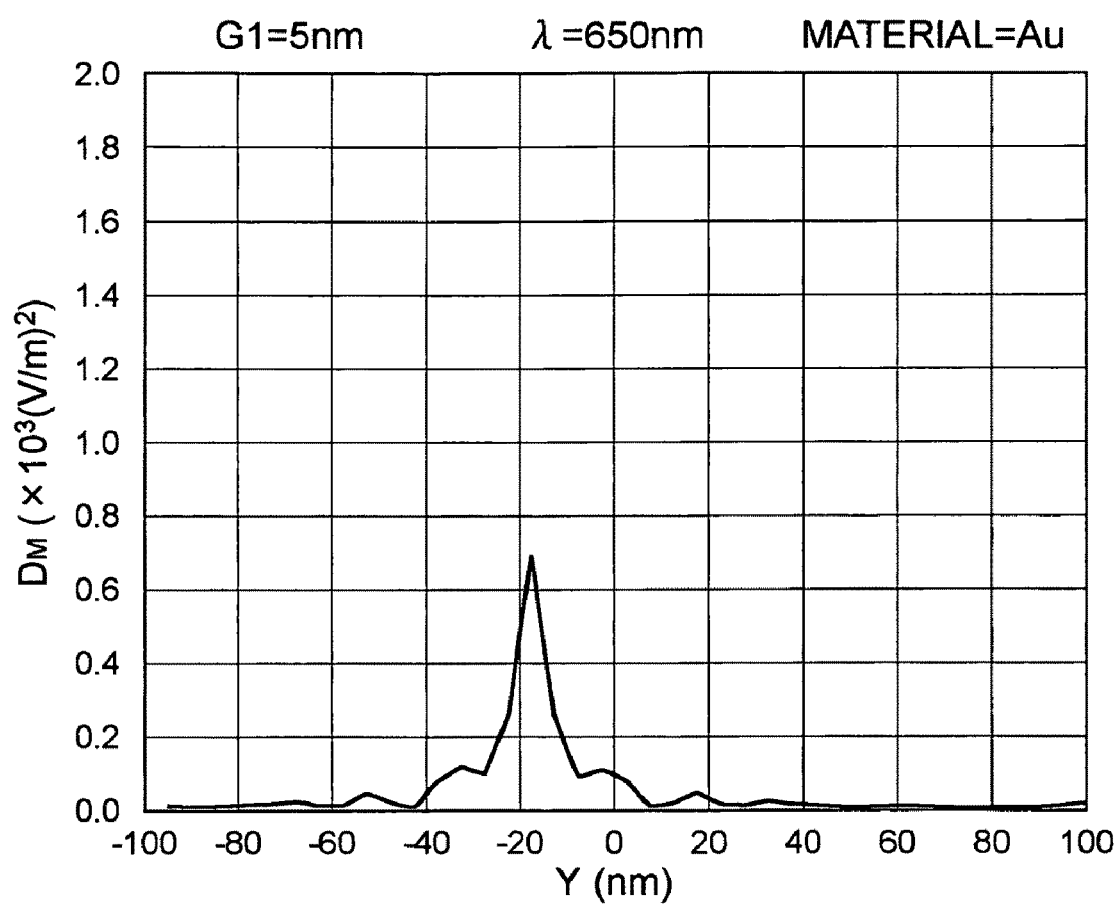
FIG. 15 is a graph illustrating near-field light intensity distribution in the vicinity of a gap of a plasmon antenna.

FIG. 9 and FIG. 15 illustrate the near-field light intensity distribution when distance G1=5 nm, laser beam wavelength λ=650 nm and plasmon antenna material=Au. An intensity peak was observed in the gap.

Figure 10:
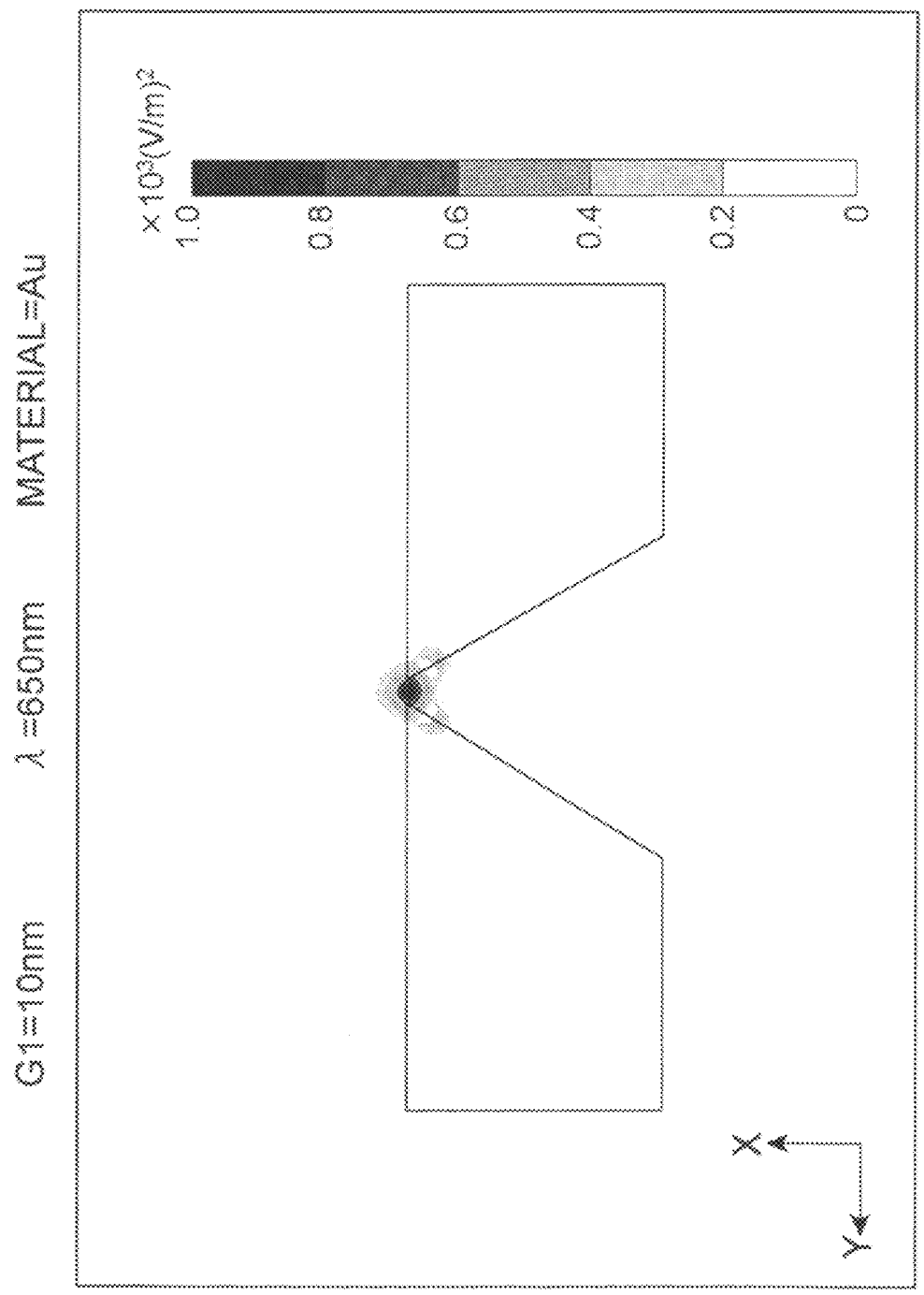
FIG. 10 is a diagram illustrating near-field light intensity distribution in the vicinity of a gap of a plasmon antenna.
Figure 16:
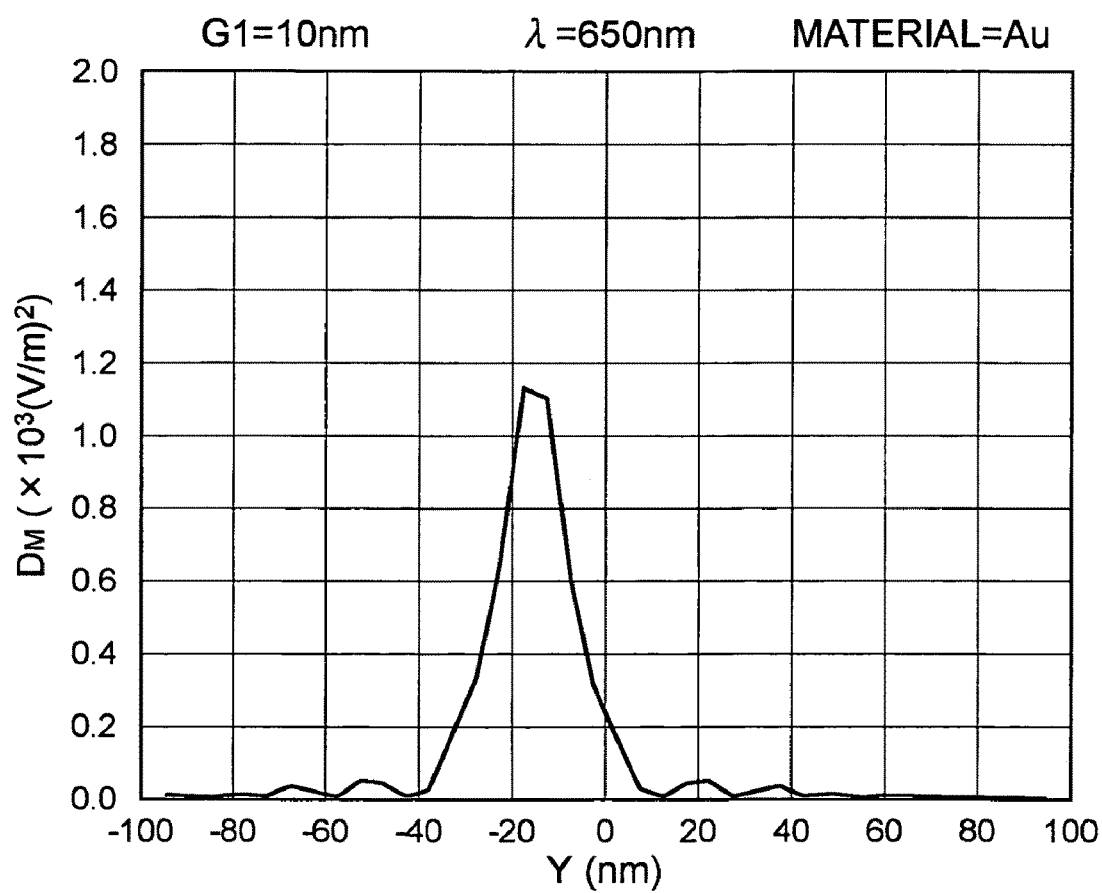
FIG. 16 is a graph illustrating near-field light intensity distribution in the vicinity of a gap of a plasmon antenna.

FIG. 10 and FIG. 16 illustrate the near-field light intensity distribution when G1=10 nm, laser beam wavelength λ=650 nm and plasmon antenna material=Au. An intensity peak was observed in the gap, and although the maximum value of the intensity increased, the distribution region became more spread out, so that the intensity per unit surface area dropped relative to that for G1=5 nm.

Figure 11:
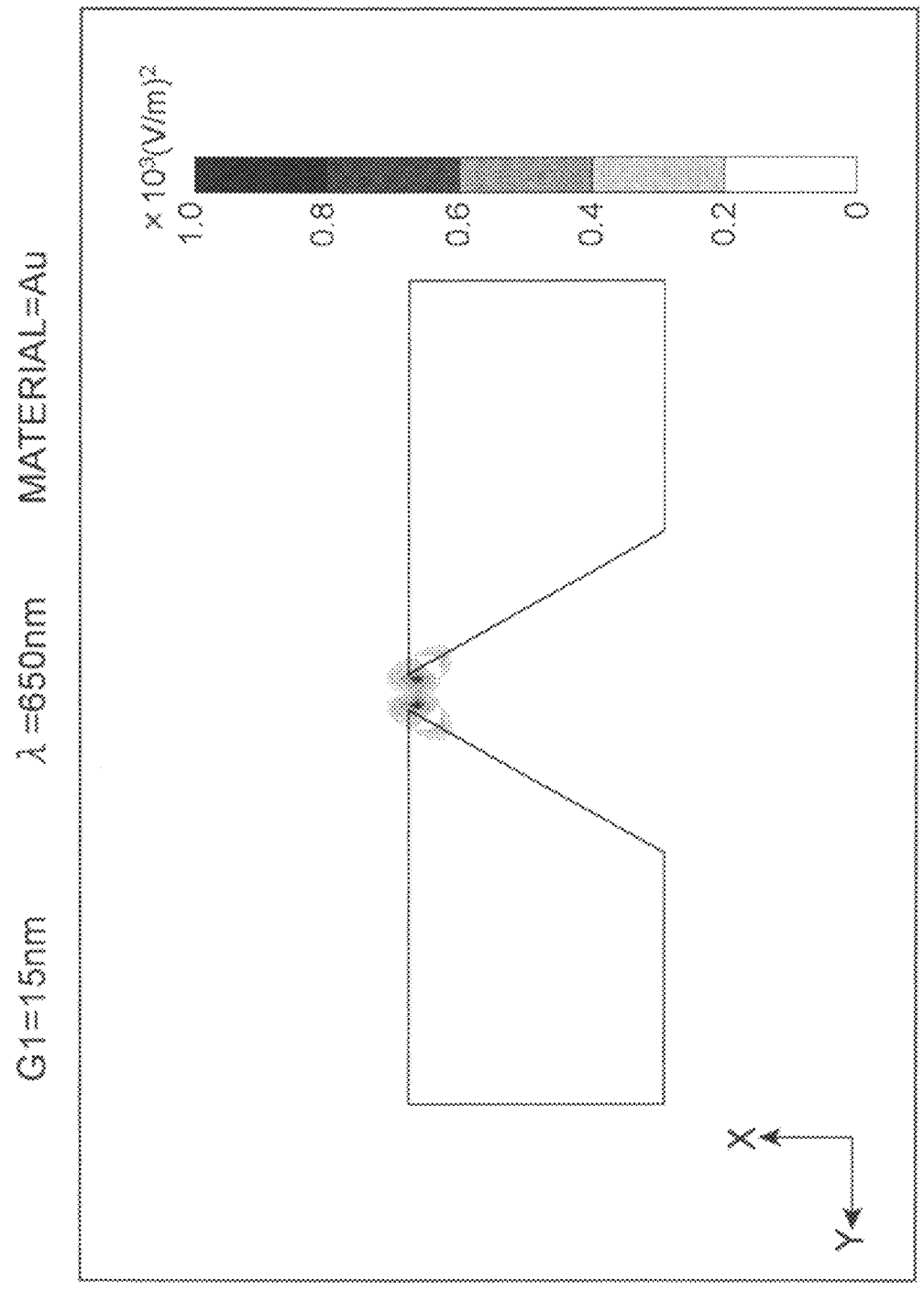
FIG. 11 is a diagram illustrating near-field light intensity distribution in the vicinity of a gap of a plasmon antenna.
Figure 17:
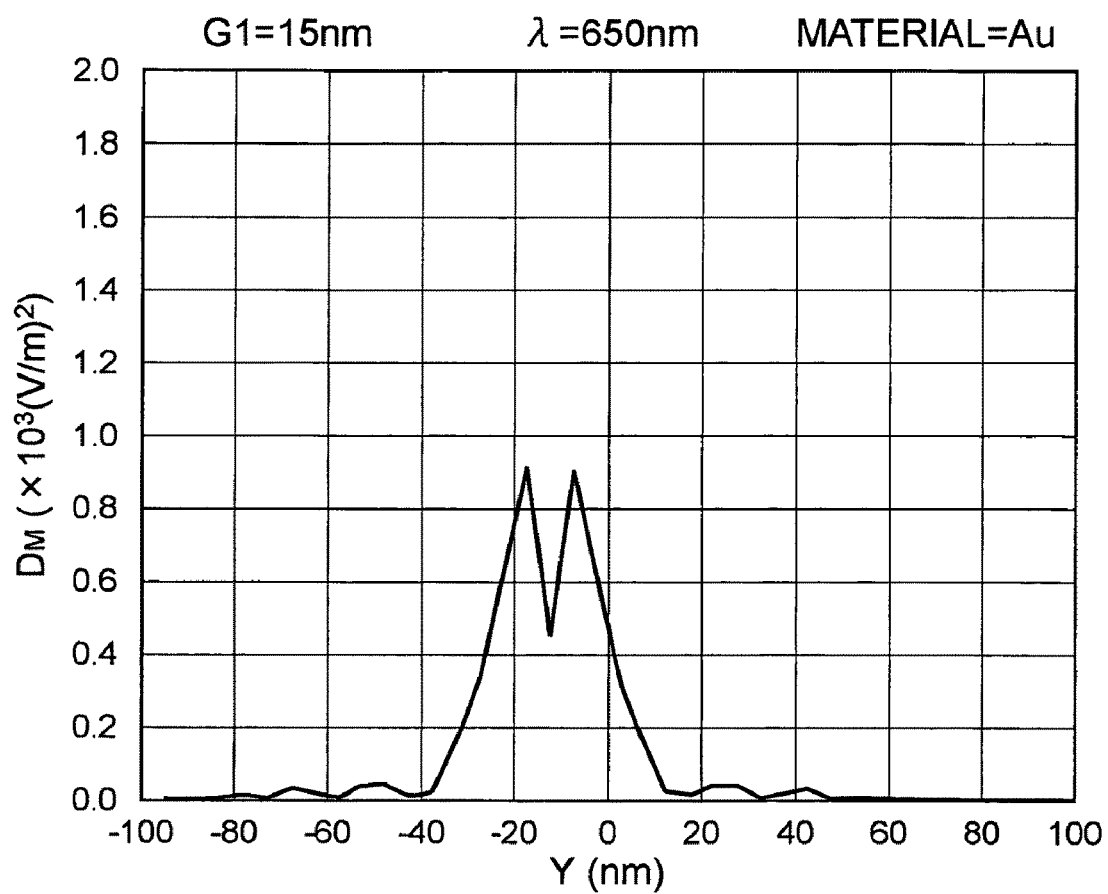
FIG. 17 is a graph illustrating near-field light intensity distribution in the vicinity of a gap of a plasmon antenna.

FIG. 11 and FIG. 17 illustrate the near-field light intensity distribution when distance G1=15 nm, laser beam wavelength λ=650 nm and plasmon antenna material=Au. The intensity peak observed in the gap was split into two peaks, and the intensity maximum value was smaller.

Figure 12:
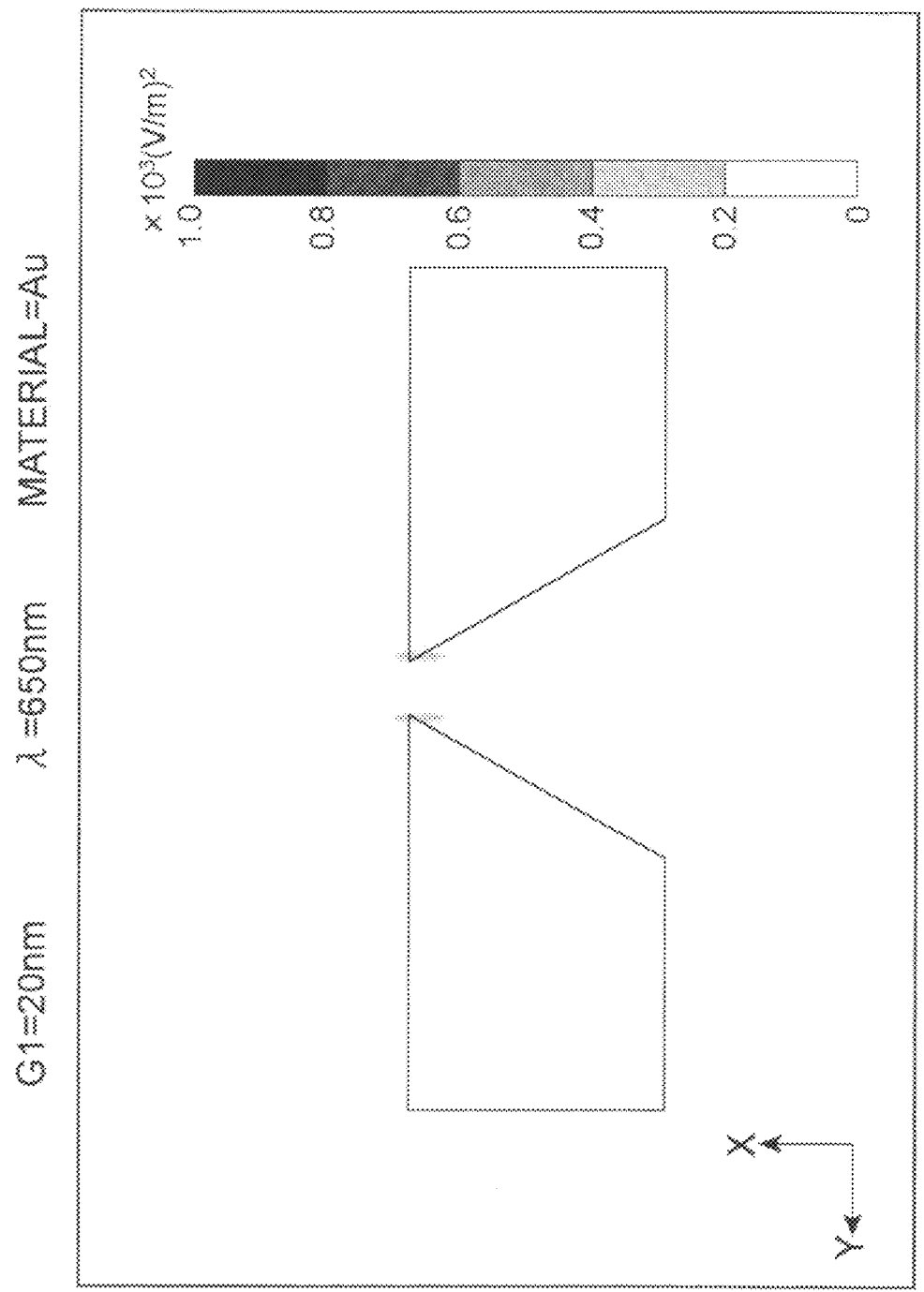
FIG. 12 is a diagram illustrating near-field light intensity distribution in the vicinity of a gap of a plasmon antenna.
Figure 18:
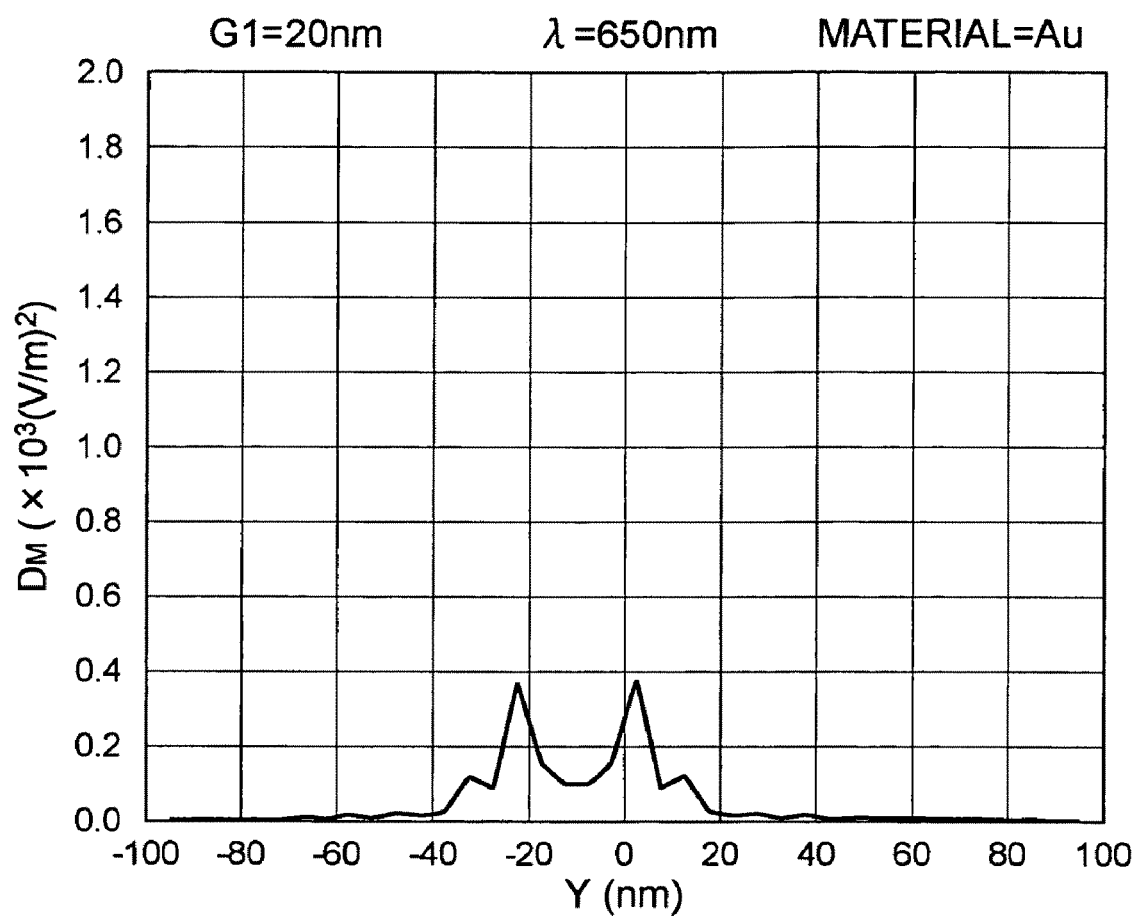
FIG. 18 is a graph illustrating near-field light intensity distribution in the vicinity of a gap of a plasmon antenna.

FIG. 12 and FIG. 18 illustrate the near-field light intensity distribution when distance G1=20 nm, laser beam wavelength λ=650 nm and plasmon antenna material=Au. Two intensity peaks were observed in the vicinity of the respective corners. The intensity maximum dropped considerably.

Figure 13:
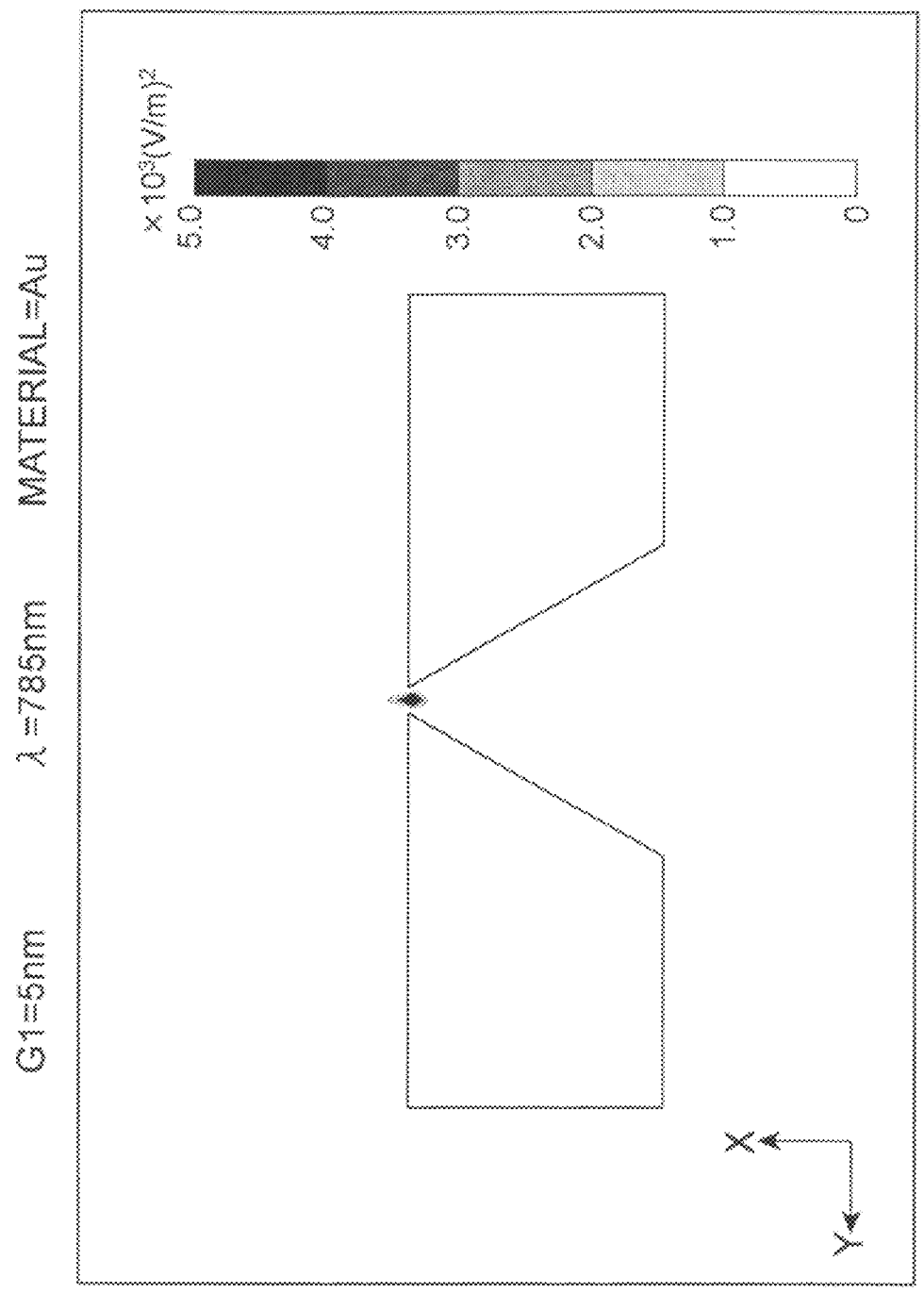
FIG. 13 is a diagram illustrating near-field light intensity distribution in the vicinity of a gap of a plasmon antenna.
Figure 19:
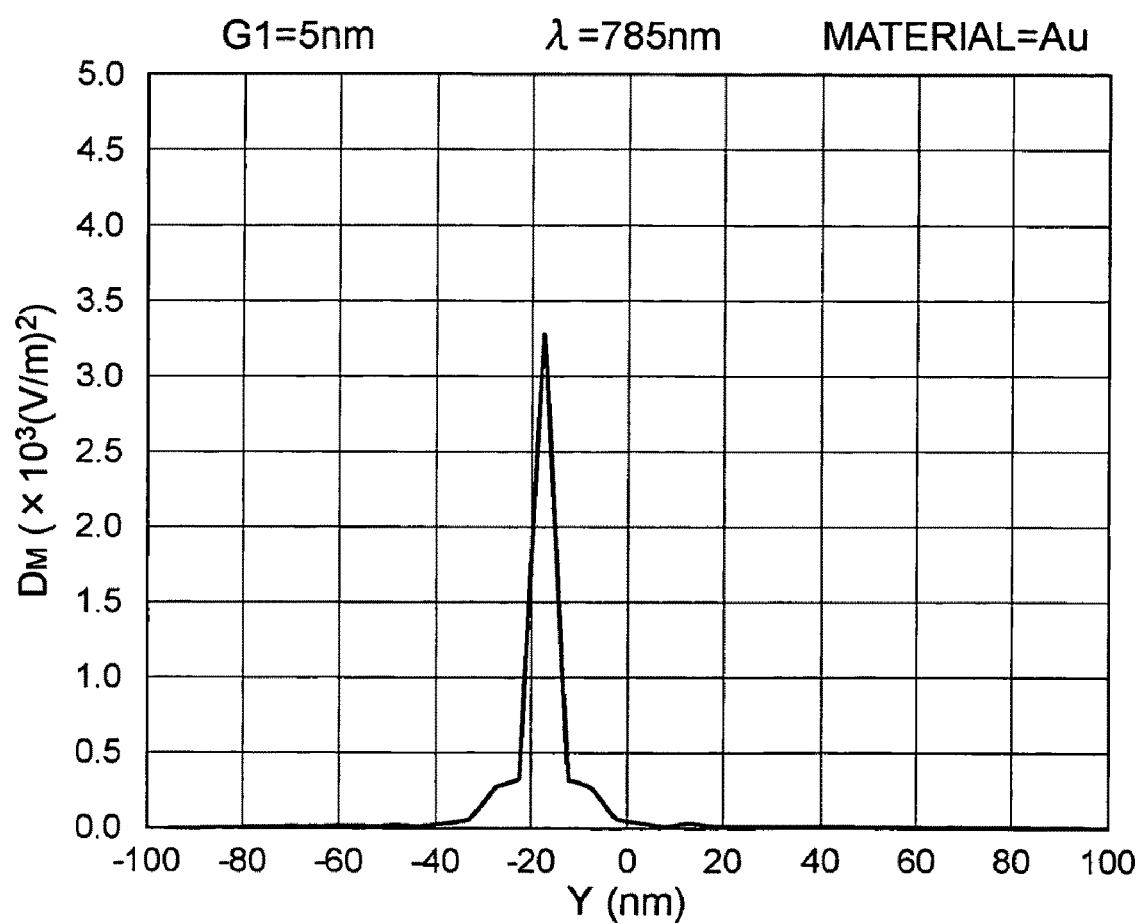
FIG. 19 is a graph illustrating near-field light intensity distribution in the vicinity of a gap of a plasmon antenna.

FIG. 13 and FIG. 19 illustrate the near-field light intensity distribution when distance G1=5 nm, laser beam wavelength λ=785 nm and plasmon antenna material=Au. It is found that when the material of the plasmon antenna is Au, a laser beam wavelength of 785 nm, higher than 650 nm, facilitates plasmon resonance, which makes for high near-field light intensity. In this example the peak intensity reaches 3300 (V/m)$^2$.

Figure 14:
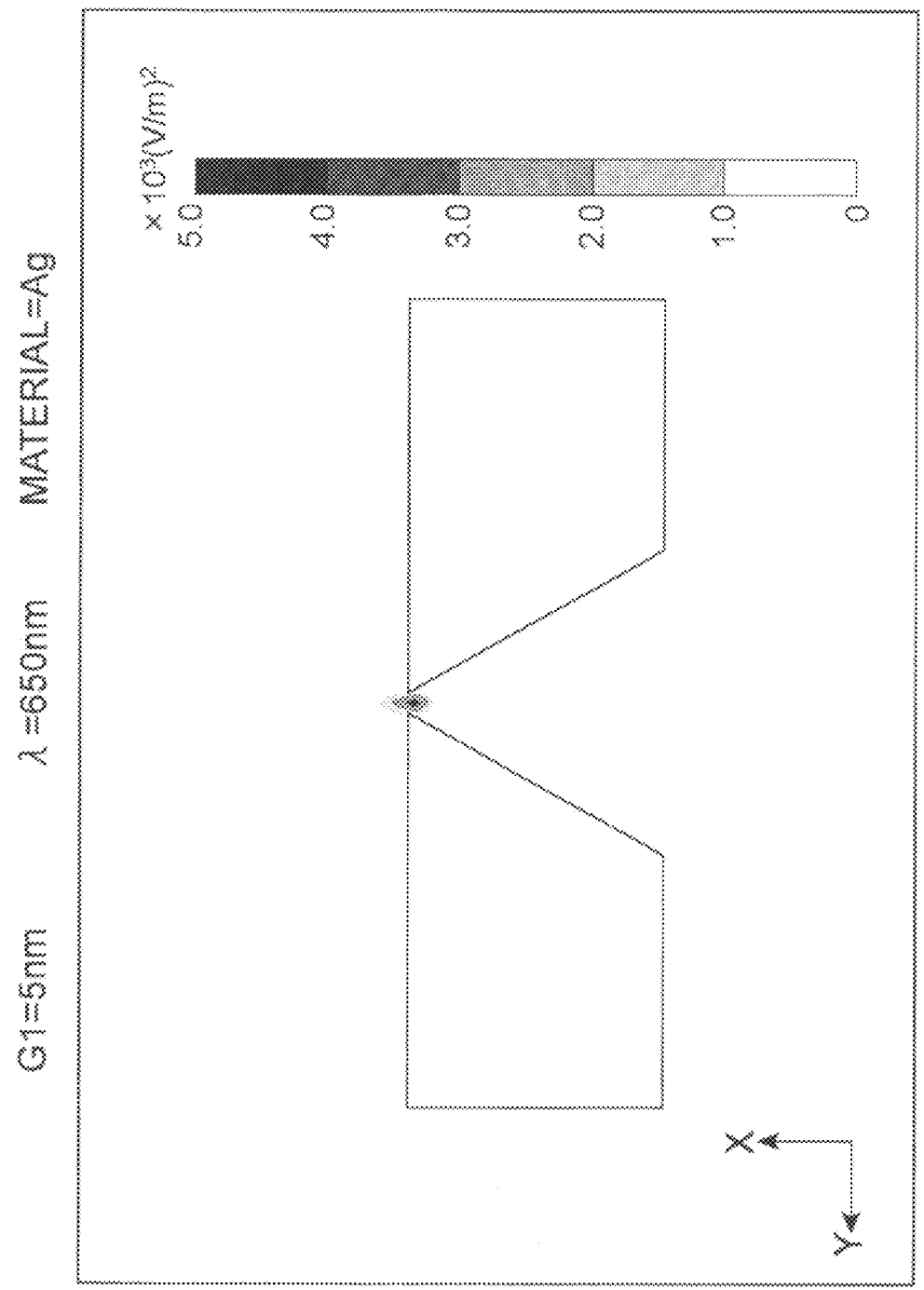
FIG. 14 is a diagram illustrating near-field light intensity distribution in the vicinity of a gap of a plasmon antenna.
Figure 20:
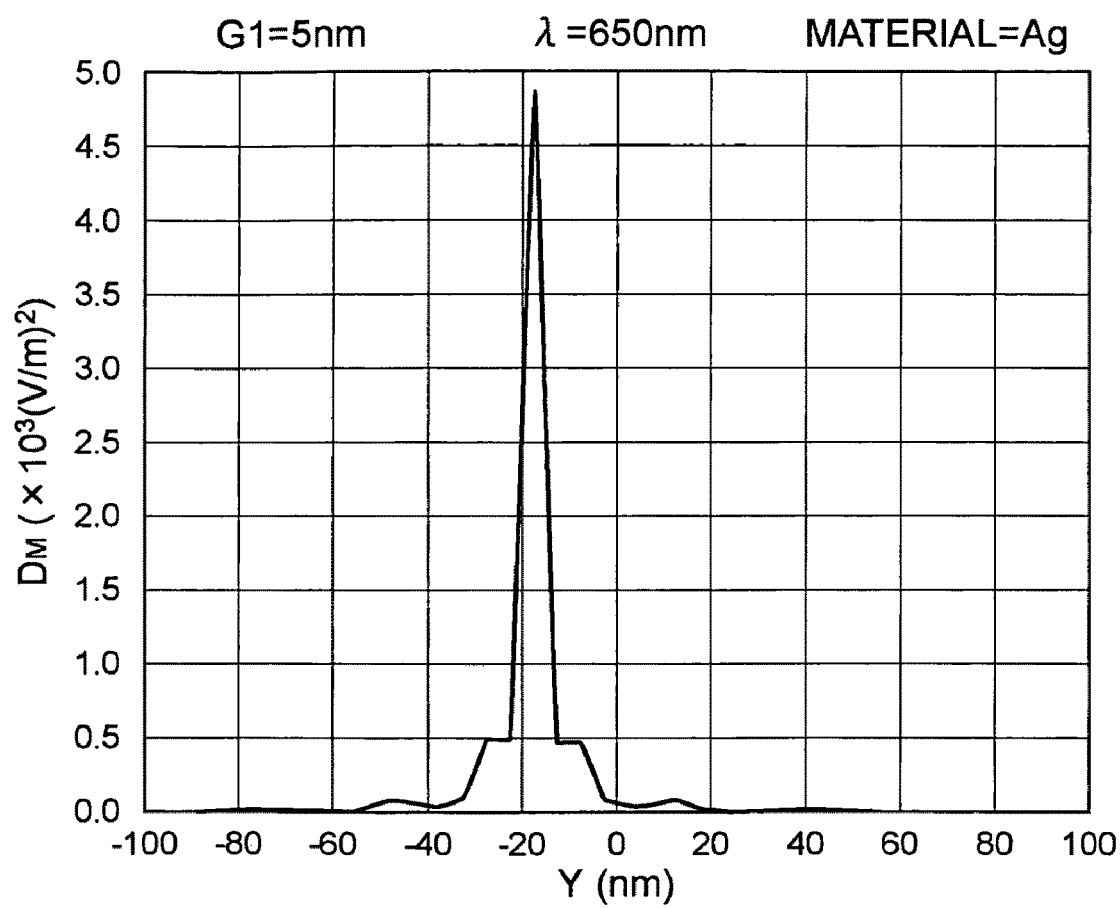
FIG. 20 is a graph illustrating near-field light intensity distribution in the vicinity of a gap of a plasmon antenna.

FIG. 14 and FIG. 20 illustrate the near-field light intensity distribution when distance G1=5 nm, laser beam wavelength λ=650 nm and plasmon antenna material=Ag. It is found that when the laser beam wavelength is 650 nm and the material of the plasmon antenna is Ag, plasmon resonance occurs more readily than AU, making for high near-field light intensity. In this example the peak intensity reaches 4800 (V/m)$^2$. Thus, the small metal bodies 8A, 8B that make up the plasmon antenna may comprise Au or Ag. Plasmon resonance was observed in the simulations using these metals, but other metals may be used as the small metal bodies.

A method for manufacturing the above-described plasmon antenna is explained next.

Figure 21A:
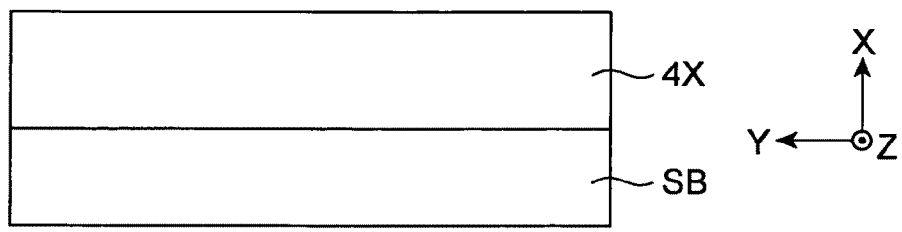
FIG. 21A is an XY cross-sectional diagram (along an A-A arrow) of a plasmon antenna intermediate, for explaining a plasmon antenna manufacturing method.
Figure 21B:
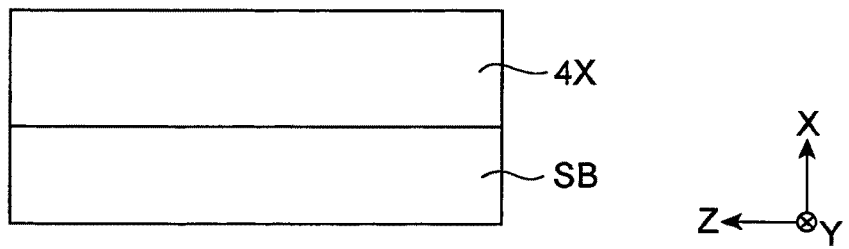
FIG. 21B is an XZ cross-sectional diagram (along a B-B arrow) of a plasmon antenna intermediate, for explaining a plasmon antenna manufacturing method.
Figure 21C:
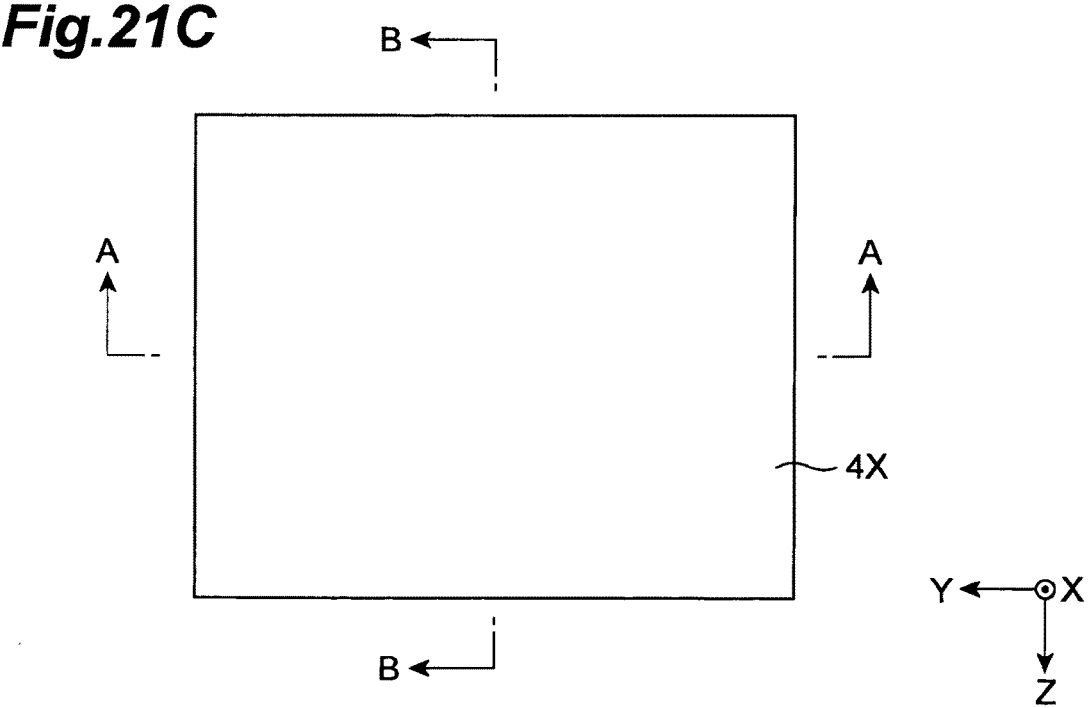
FIG. 21C is a plan-view diagram of an intermediate of a plasmon antenna, for explaining a plasmon antenna manufacturing method.

FIG. 21C is a plan-view diagram of a plasmon antenna intermediate; FIG. 21A is an XY cross-sectional diagram (along the A-A arrow) of the plasmon antenna intermediate; and FIG. 21B is an XZ cross-sectional diagram (along the B-B arrow) of the plasmon antenna intermediate.

Firstly, the insulating section 4X comprising a waveguide material (insulator: tantalum oxide (TaO$_x$)) is formed on the substrate SB. Sputtering can be used for forming the insulating section 4X, with tantalum oxide as the target. The insulating section 4X may also be formed by depositing metallic tantalum, followed by oxidation thereof.

Figure 22A:
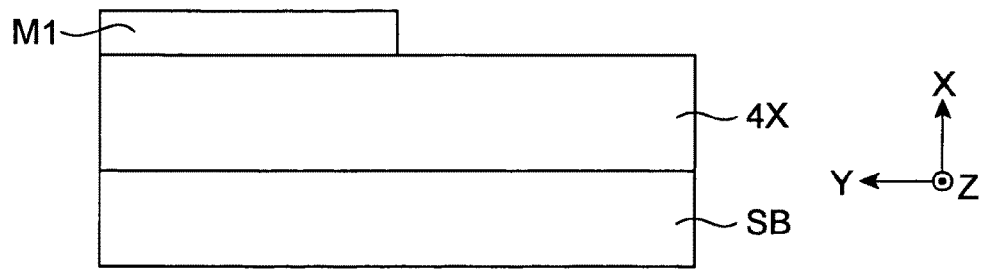
FIG. 22A is an XY cross-sectional diagram (along an A-A arrow) of a plasmon antenna intermediate, for explaining a plasmon antenna manufacturing method.
Figure 22B:
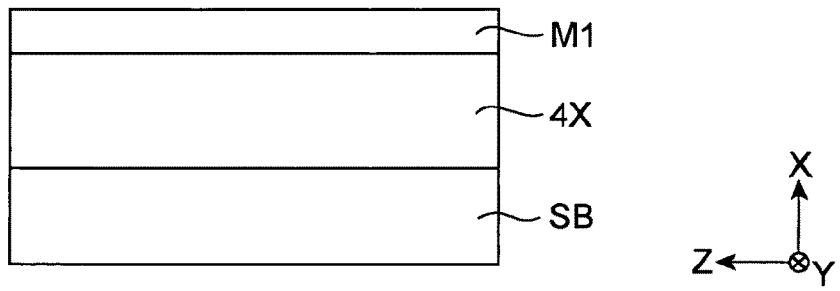
FIG. 22B is an XZ cross-sectional diagram (along a B-B arrow) of a plasmon antenna intermediate, for explaining a plasmon antenna manufacturing method.
Figure 22C:
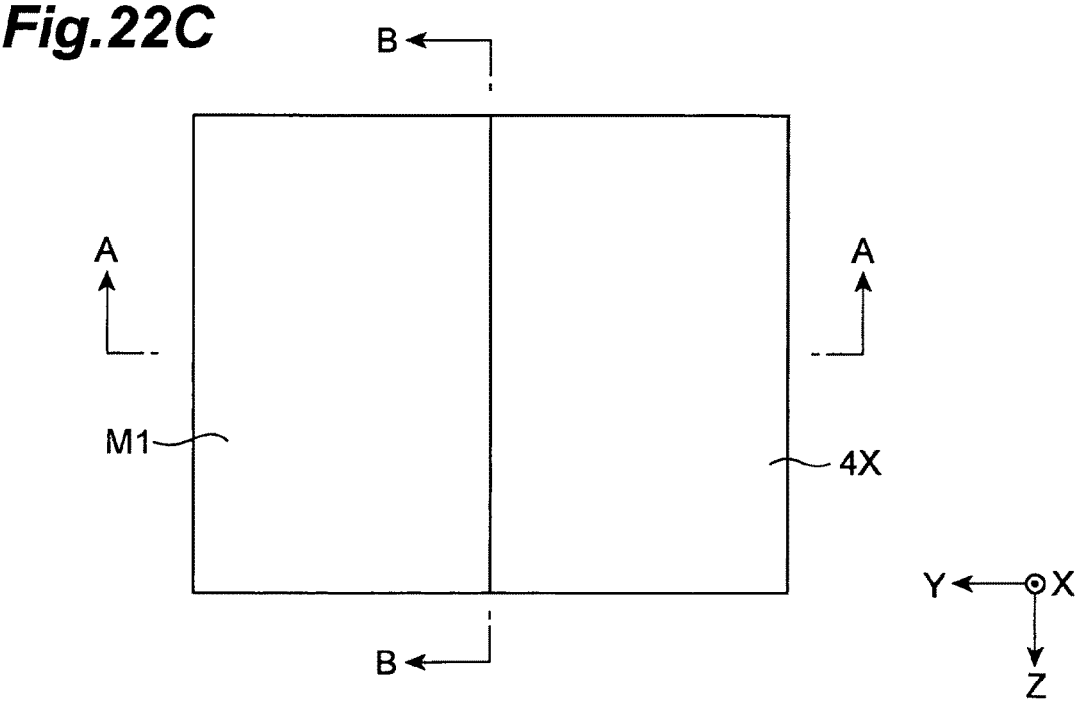
FIG. 22C is a plan-view diagram of an intermediate of a plasmon antenna, for explaining a plasmon antenna manufacturing method.

FIG. 22C is a plan-view diagram of a plasmon antenna intermediate; FIG. 22A is an XY cross-sectional diagram (along the A-A arrow) of the plasmon antenna intermediate; and FIG. 22B is an XZ cross-sectional diagram (along the B-B arrow) of the plasmon antenna intermediate.

A mask M1 comprising a metal film (NiFe) is patterned next on the insulating section 4X. The mask M1 is formed only on the region to the left of the central position of the insulating section 4X, in the Y-axis direction.

Figure 23A:
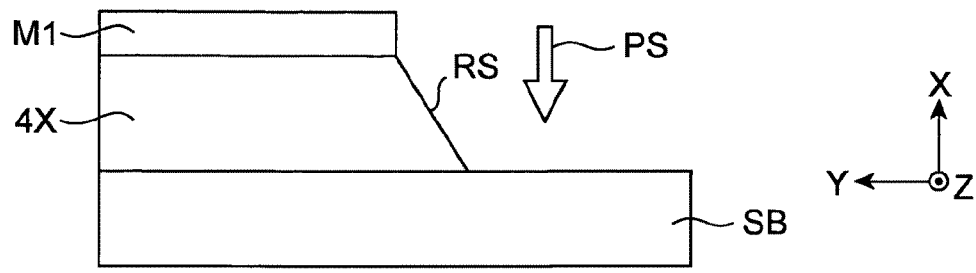
FIG. 23A is an XY cross-sectional diagram (along an A-A arrow) of a plasmon antenna intermediate, for explaining a plasmon antenna manufacturing method.
Figure 23B:
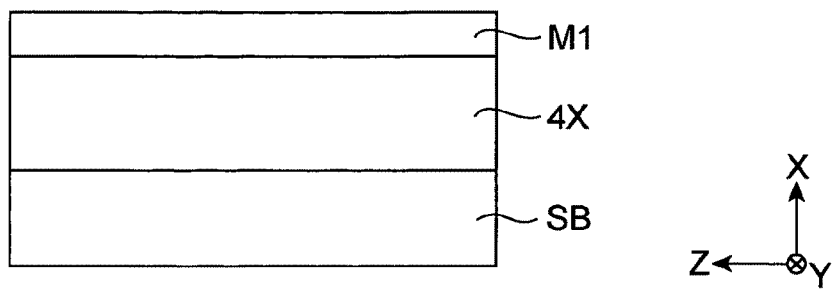
FIG. 23B is an XZ cross-sectional diagram (along a B-B arrow) of a plasmon antenna intermediate, for explaining a plasmon antenna manufacturing method.
Figure 23C:
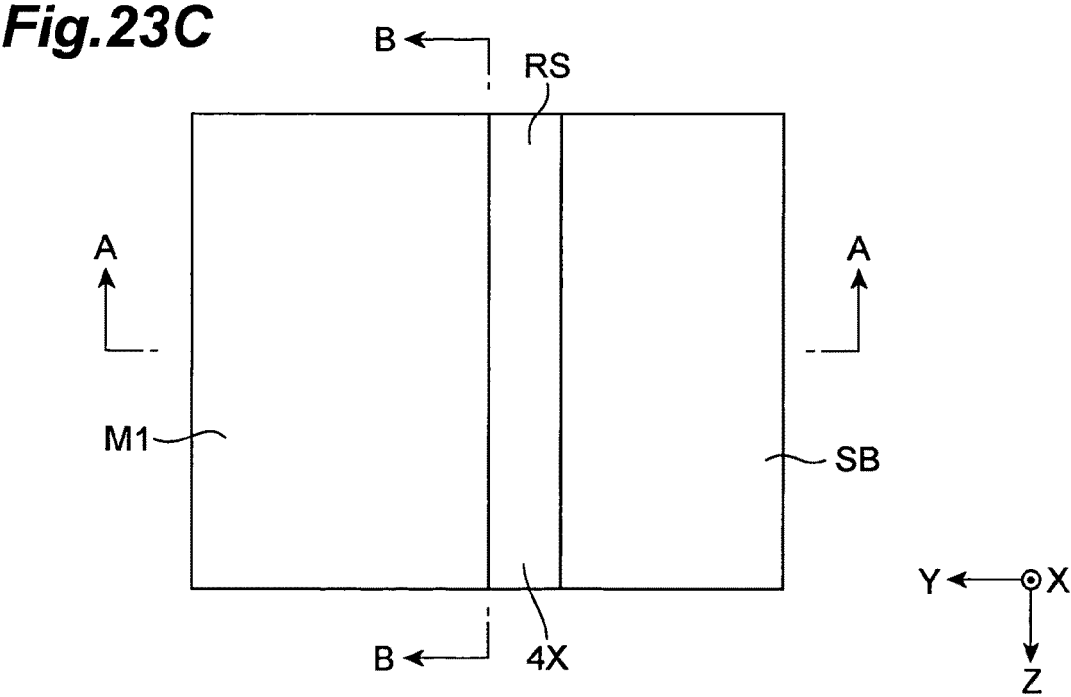
FIG. 23C is a plan-view diagram of an intermediate of a plasmon antenna, for explaining a plasmon antenna manufacturing method.

FIG. 23C is a plan-view diagram of a plasmon antenna intermediate; FIG. 23A is an XY cross-sectional diagram (along the A-A arrow) of the plasmon antenna intermediate; and FIG. 23B is an XZ cross-sectional diagram (along the B-B arrow) of the plasmon antenna intermediate.

Thereafter, ions PS are caused to collide against the YZ plane, to remove the insulating section 4X not covered by the mask M1. As the species of the ions PS there is used CF$_4$, which is reactive with the insulating section 4X. Specifically, a partial area of the insulating section 4X is removed by reactive ion etching (RIE) until exposing the substrate SB, to form thereby a right-side inclined surface RS of the insulating section 4X. The right-side inclined surface RS is positioned at the boundary between the substrate SB and the exposed surface.

Figure 24A:
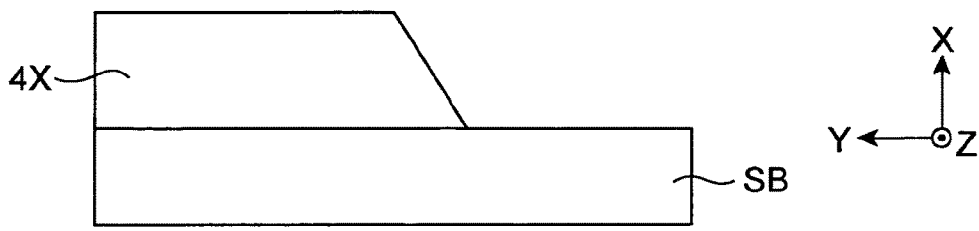
FIG. 24A is an XY cross-sectional diagram (along an A-A arrow) of a plasmon antenna intermediate, for explaining a plasmon antenna manufacturing method.
Figure 24B:
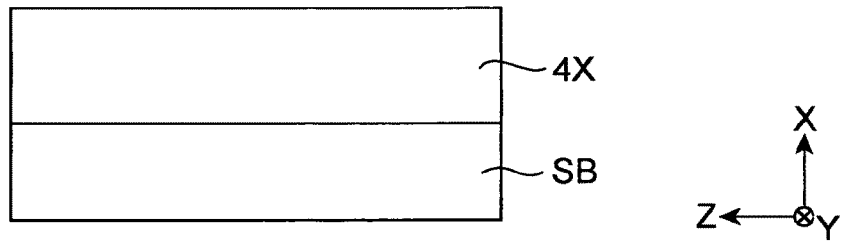
FIG. 24B is an XZ cross-sectional diagram (along a B-B arrow) of a plasmon antenna intermediate, for explaining a plasmon antenna manufacturing method.
Figure 24C:
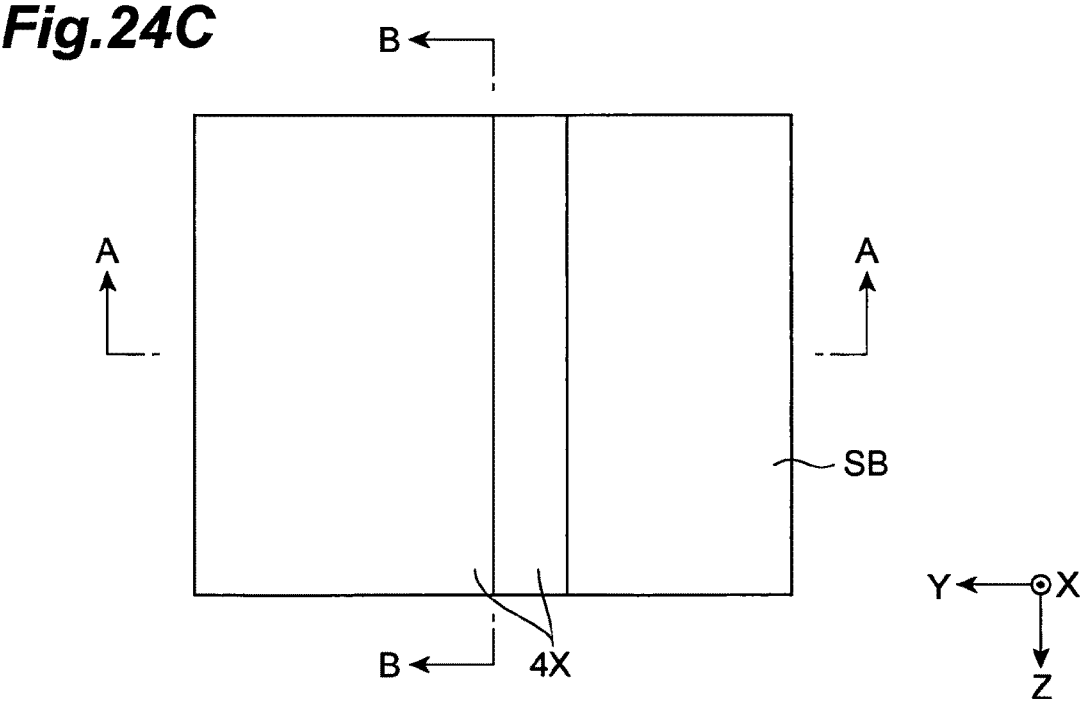
FIG. 24C is a plan-view diagram of an intermediate of a plasmon antenna, for explaining a plasmon antenna manufacturing method.

FIG. 24C is a plan-view diagram of a plasmon antenna intermediate; FIG. 24A is an XY cross-sectional diagram (along the A-A arrow) of the plasmon antenna intermediate; and FIG. 24B is an XZ cross-sectional diagram (along the B-B arrow) of the plasmon antenna intermediate.

The mask M1 is removed next by milling using argon or the like, to expose the surface of the left-side region of the insulating section 4X.

Figure 25A:
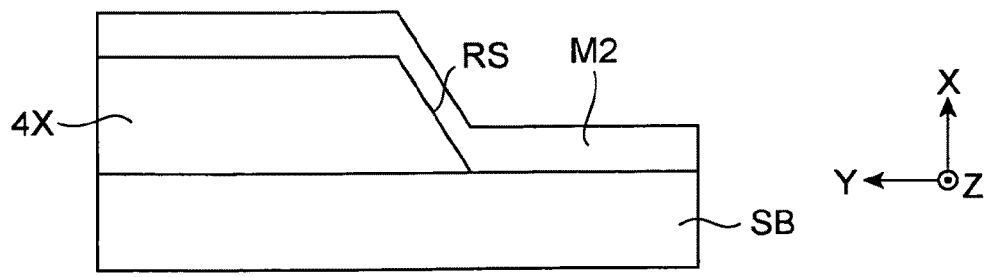
FIG. 25A is an XY cross-sectional diagram (along an A-A arrow) of a plasmon antenna intermediate, for explaining a plasmon antenna manufacturing method.
Figure 25B:
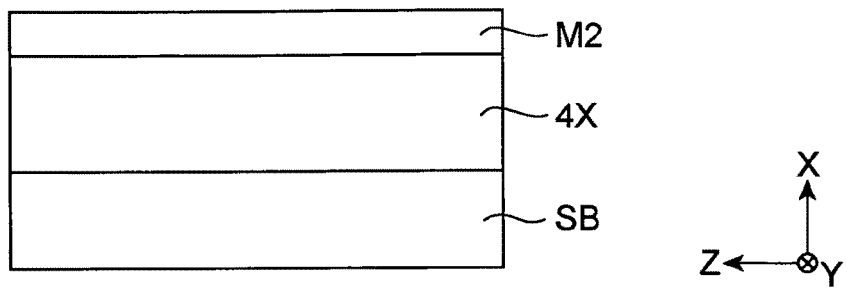
FIG. 25B is an XZ cross-sectional diagram (along a B-B arrow) of a plasmon antenna intermediate, for explaining a plasmon antenna manufacturing method.
Figure 25C:
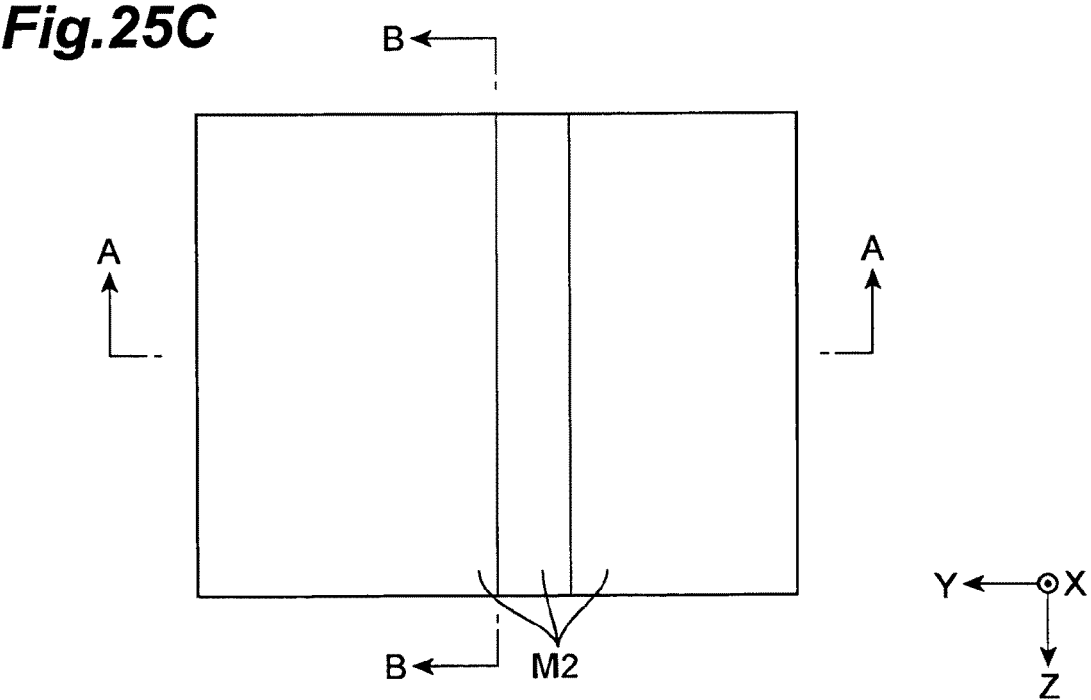
FIG. 25C is a plan-view diagram of an intermediate of a plasmon antenna, for explaining a plasmon antenna manufacturing method.

FIG. 25C is a plan-view diagram of a plasmon antenna intermediate; FIG. 25A is an XY cross-sectional diagram (along the A-A arrow) of the plasmon antenna intermediate; and FIG. 25B is an XZ cross-sectional diagram (along the B-B arrow) of the plasmon antenna intermediate.

A mask M2 comprising a metal film (NiFe) is formed again over the entire surface of the exposed insulating section 4× and the substrate SB. The mask M2 covers thereby the upper surface of the insulating section 4X, the right-side inclined surface RS and the surface of the substrate SB.

Figure 26A:
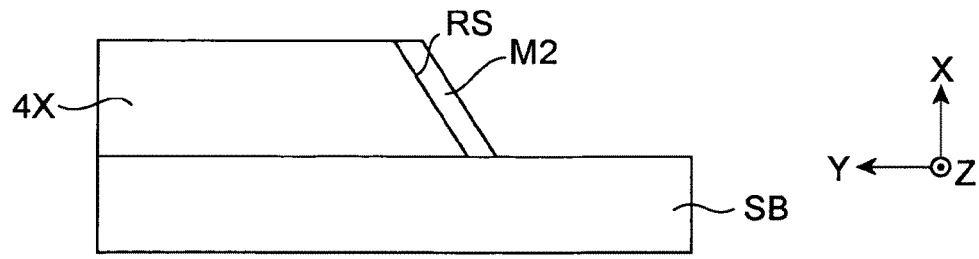
FIG. 26A is an XY cross-sectional diagram (along an A-A arrow) of a plasmon antenna intermediate, for explaining a plasmon antenna manufacturing method.
Figure 26B:
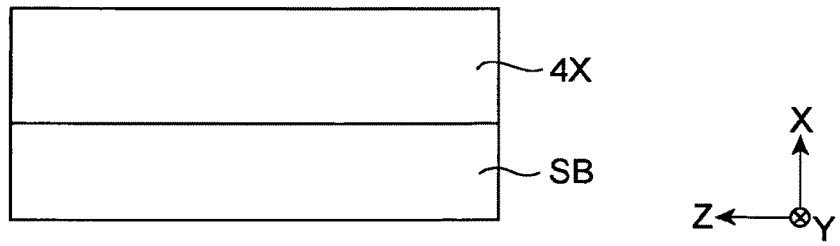
FIG. 26B is an XZ cross-sectional diagram (along a B-B arrow) of a plasmon antenna intermediate, for explaining a plasmon antenna manufacturing method.
Figure 26C:
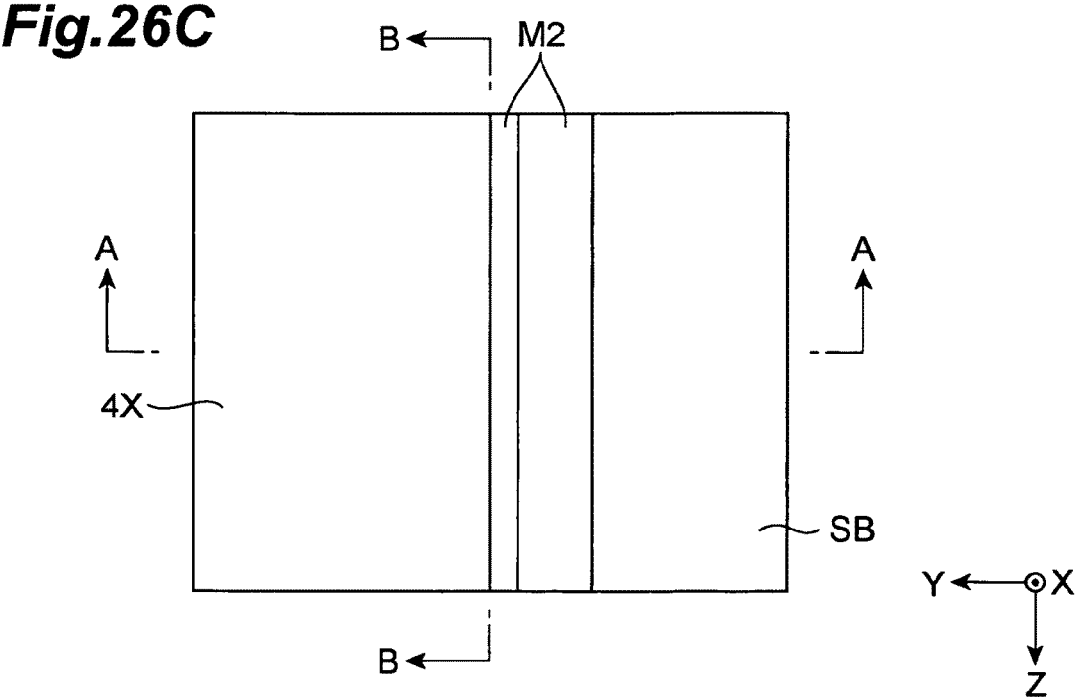
FIG. 26C is a plan-view diagram of an intermediate of a plasmon antenna, for explaining a plasmon antenna manufacturing method.

FIG. 26C is a plan-view diagram of a plasmon antenna intermediate; FIG. 26A is an XY cross-sectional diagram (along the A-A arrow) of the plasmon antenna intermediate; and FIG. 26B is an XZ cross-sectional diagram (along the B-B 25 arrow) of the plasmon antenna intermediate.

The mask M2 is the milled through collision of noble gas atoms such as Ar that strike the surface of the mask M2 from an oblique direction. Herein, the direction in which the noble gas is jetted is kept fixed, and the substrate SB is rotated around the X-axis. Thanks to being positioned in the shadow of the surrounding mask, the mask M2 on the right-side inclined surface RS does not become etched throughout the period over which noble gas is jetted from the left of the figure. As a result, the mask M2 is left unremoved on the right-side inclined surface RS after the mask M2 on the surrounding left-side inclined surface RS has between removed.

Figure 27A:
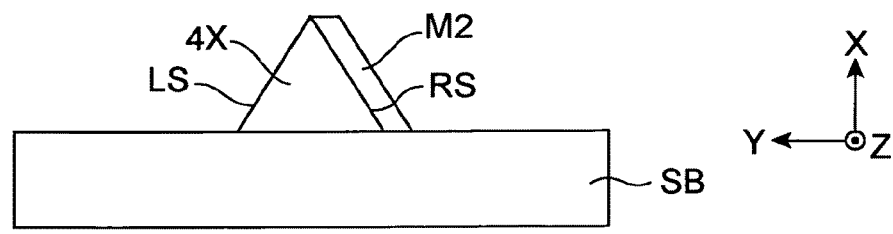
FIG. 27A is an XY cross-sectional diagram (along an A-A arrow) of a plasmon antenna intermediate, for explaining a plasmon antenna manufacturing method.
Figure 27B:
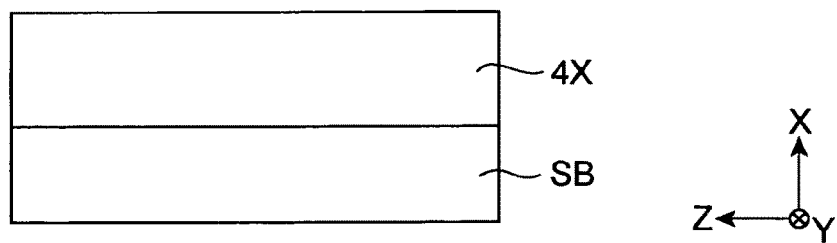
FIG. 27B is an XZ cross-sectional diagram (along a B-B arrow) of a plasmon antenna intermediate, for explaining a plasmon antenna manufacturing method.
Figure 27C:
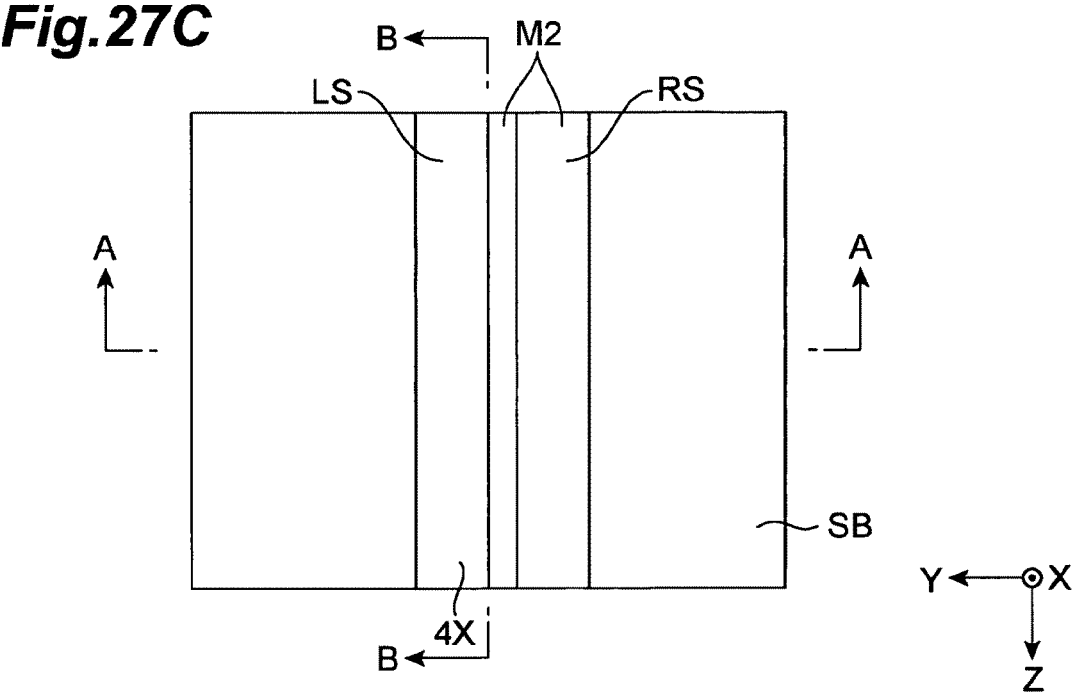
FIG. 27C is a plan-view diagram of an intermediate of a plasmon antenna, for explaining a plasmon antenna manufacturing method.

FIG. 27C is a plan-view diagram of a plasmon antenna intermediate; FIG. 27A is an XY cross-sectional diagram (along the A-A arrow) of the plasmon antenna intermediate; and FIG. 27B is an XZ cross-sectional diagram (along the B-B arrow) of the plasmon antenna intermediate.

Thereafter, the exposed surface of the insulating section 4X is etched, using the remaining mask M2, until the substrate SB is exposed, to form a left-side inclined surface LS of the insulating section 4X. This etching is carried out by reactive ion etching (RIE) using $CF_4$, as above, with the mask M2 remaining after etching.

Figure 28A:
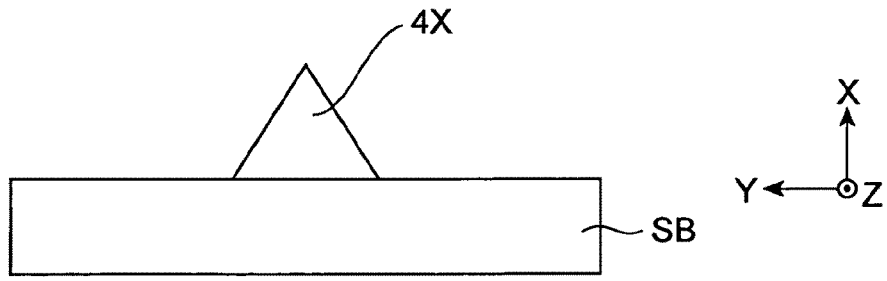
FIG. 28A is an XY cross-sectional diagram (along an A-A arrow) of a plasmon antenna intermediate, for explaining a plasmon antenna manufacturing method.
Figure 28B:
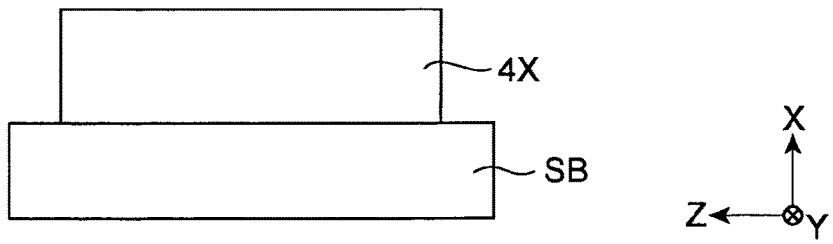
FIG. 28B is an XZ cross-sectional diagram (along a B-B arrow) of a plasmon antenna intermediate, for explaining a plasmon antenna manufacturing method.
Figure 28C:
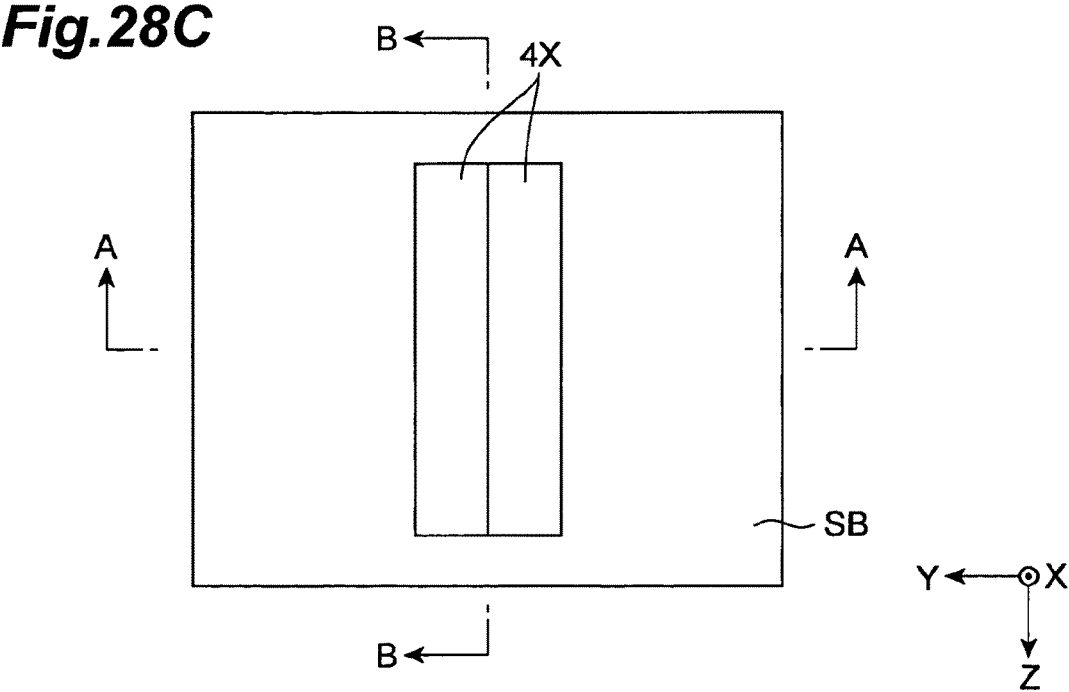
FIG. 28C is a plan-view diagram of an intermediate of a plasmon antenna, for explaining a plasmon antenna manufacturing method.

FIG. 28C is a plan-view diagram of a plasmon antenna intermediate; FIG. 28A is an XY cross-sectional diagram (along the A-A arrow) of the plasmon antenna intermediate; and FIG. 28B is an XZ cross-sectional diagram (along the B-B arrow) of the plasmon antenna intermediate.

The mask M2 is finally removed next through milling using a noble gas such as argon (Ar), to form a protrusion comprising the insulating section 4X. In the step of FIG. 27A to FIG. 27C, the mask M2 can also be removed through RIE, by appropriately setting the thickness of the mask M2 and the concentration of the ion species used for etching in such a manner that the mask M2 is removed once the step of FIG. 27A to FIG. 27C is over.

Figure 29A:
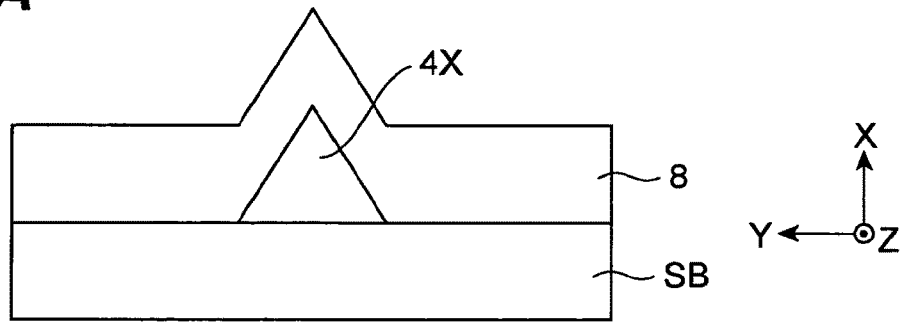
FIG. 29A is an XY cross-sectional diagram (along an A-A arrow) of a plasmon antenna intermediate, for explaining a plasmon antenna manufacturing method.
Figure 29B:
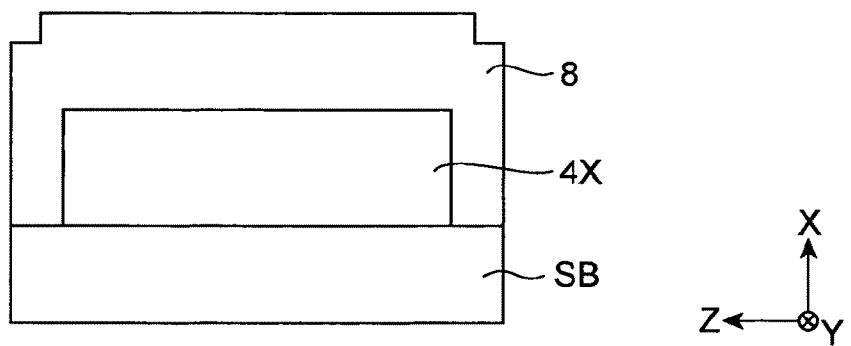
FIG. 29B is an XZ cross-sectional diagram (along a B-B arrow) of a plasmon antenna intermediate, for explaining a plasmon antenna manufacturing method.
Figure 29C:
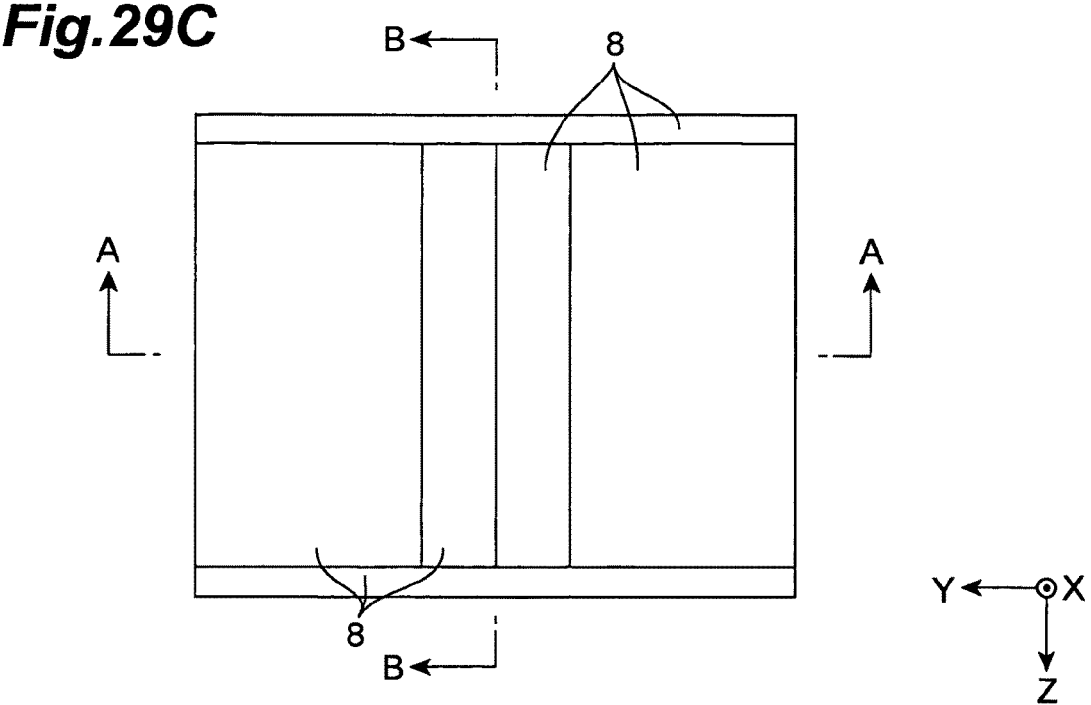
FIG. 29C is a plan-view diagram of an intermediate of a plasmon antenna, for explaining a plasmon antenna manufacturing method.

FIG. 29C is a plan-view diagram of a plasmon antenna intermediate; FIG. 29A is an XY cross-sectional diagram (along the A-A arrow) of the plasmon antenna intermediate; and FIG. 29B is an XZ cross-sectional diagram (along the B-B arrow) of the plasmon antenna intermediate.

A metal film 8 is formed next on the exposed surface of the above-described substrate SB and insulating section 4X. To simplify the explanation, the metal film 8 and the plasmon antenna 8 are designated with the same reference numeral. The metal film 8 in the present example comprises Au, and may be formed by plating, sputtering or vapor deposition.

Figure 30A:
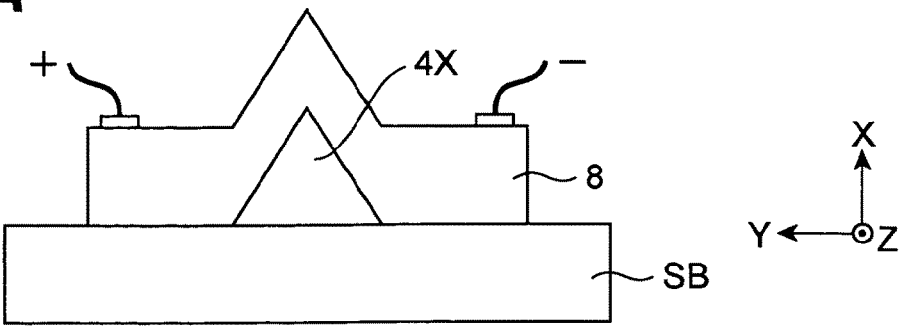
FIG. 30A is an XY cross-sectional diagram (along an A-A arrow) of a plasmon antenna intermediate, for explaining a plasmon antenna manufacturing method.
Figure 30B:
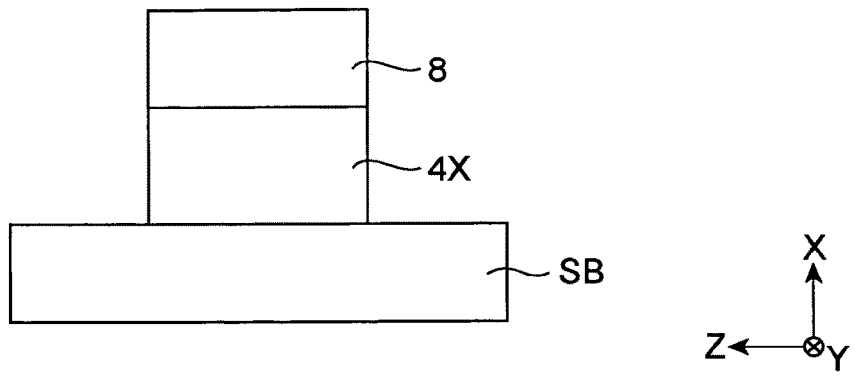
FIG. 30B is an XZ cross-sectional diagram (along a B-B arrow) of a plasmon antenna intermediate, for explaining a plasmon antenna manufacturing method.
Figure 30C:
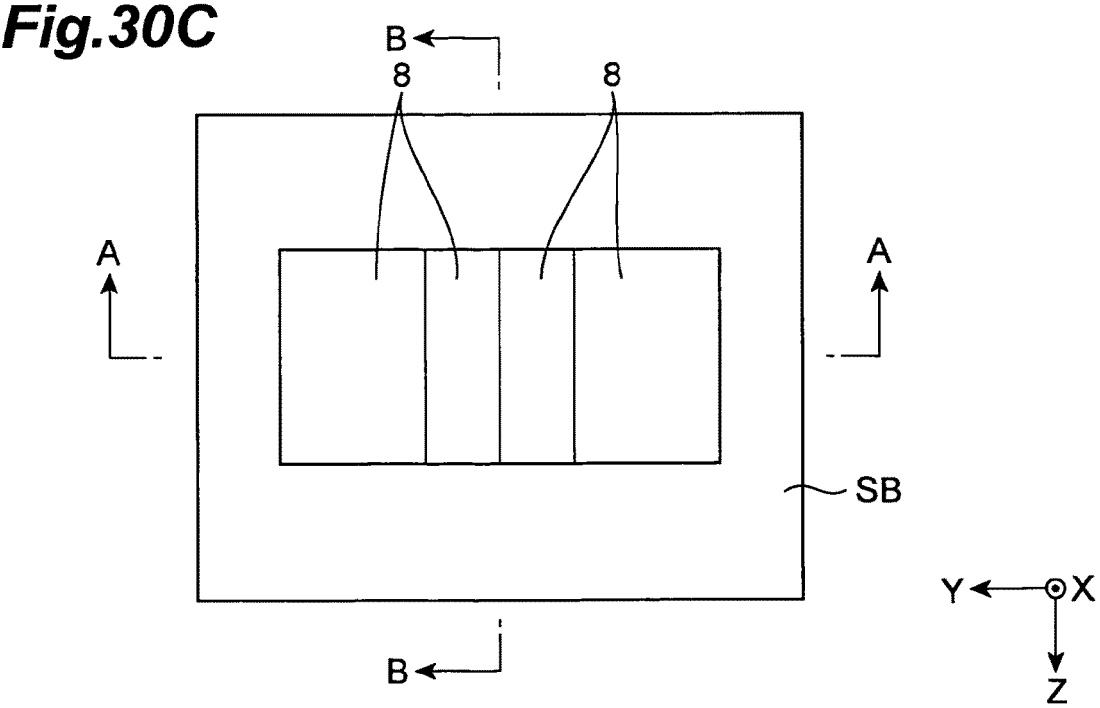
FIG. 30C is a plan-view diagram of an intermediate of a plasmon antenna, for explaining a plasmon antenna manufacturing method.

FIG. 30C is a plan-view diagram of a plasmon antenna intermediate; FIG. 30A is an XY cross-sectional diagram (along the A-A arrow) of the plasmon antenna intermediate; and FIG. 30B is an XZ cross-sectional diagram (along the B-B arrow) of the plasmon antenna intermediate.

Next, the metal film 8 and the insulating section 4X are removed from the region positioned at the periphery of the metal film 8 in the YZ plane. The metal film 8 may be removed by milling using a noble gas, with milling stopping when the substrate SB becomes exposed. Pads for connection of positive and negative tester probes are formed at both end positions in the Y-axis direction, to monitor the electric conduction state of the metal film 8. The two ends of the metal film 8 are electrically connected to each other.

Figure 31A:
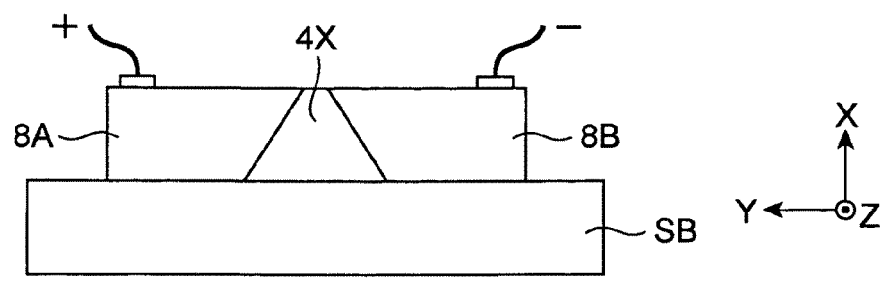
FIG. 31A is an XY cross-sectional diagram (along an A-A arrow) of a plasmon antenna intermediate, for explaining a plasmon antenna manufacturing method.
Figure 31B:
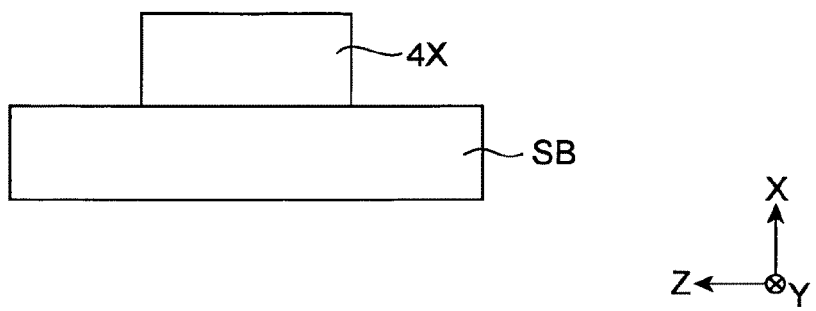
FIG. 31B is an XZ cross-sectional diagram (along a B-B arrow) of a plasmon antenna intermediate, for explaining a plasmon antenna manufacturing method.
Figure 31C:
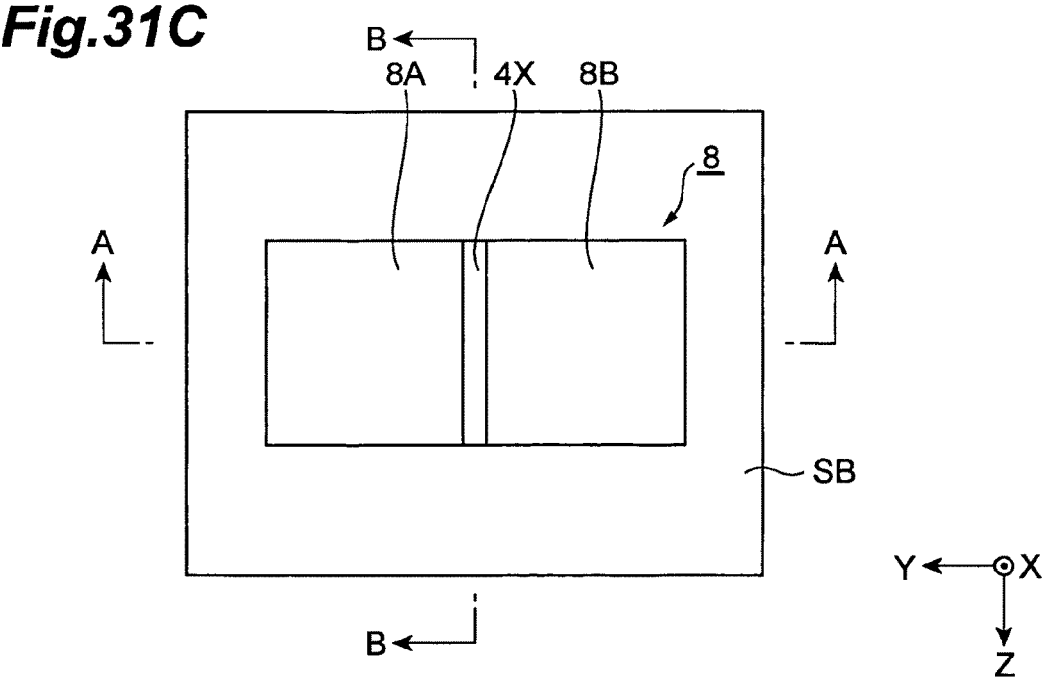
FIG. 31C is a plan-view diagram of an intermediate of a plasmon antenna, for explaining a plasmon antenna manufacturing method.

FIG. 31C is a plan-view diagram of a plasmon antenna intermediate; FIG. 31A is an XY cross-sectional diagram (along the A-A arrow) of the plasmon antenna intermediate; and FIG. 31B is an XZ cross-sectional diagram (along the B-B arrow) of the plasmon antenna intermediate.

Thereafter, the metal film 8 positioned immediately above the insulating section 4X is removed by causing a lapping surface, parallel to the YZ plane, to advance in the X-axis direction. Specifically, the exposed surface of the metal film 8 is lapped by chemical mechanical polishing (CMP). CMP is discontinued when it is detected, via the tester probes, that there is no electric conduction between the two ends of the metal film 8. At this time, the metal film 8 is divided in two, forming thereby the two small metal bodies 8A, 8B. The distance G1 of the above-described gap (FIG. 6) can be controlled by controlling the period of time that elapses between absence of conduction and discontinuing of CMP. Such a procedure is a kind of ELG (Electrical lapping guide). In ELG there is provided a resistor layer on the lapping surface, such that the resistor film becomes thinner as lapping progresses, the resulting increase in resistance being monitored. ELG measurements may also be carried out by providing the resistor layer on the surface of the insulating section 4X. The rate at which the insulating section 4X is lapped is slower than the rate at which the metal film 8 is lapped, and thus the insulating section 4X functions also as a CMP stop layer.

In a different example, a dummy metal film or resistor layer for ELG, having a same structure as the metal film or the resistor layer, may be formed at a different position on the substrate surface, such that the amount lapped by CMP can be controlled by monitoring the resistance value of the dummy. Although the lapping amount cannot be controlled in real time in this case, it can be controlled indirectly by repeatedly performing CMP and conduction measurements of the dummy metal film or resistor layer.

Figure 32A:
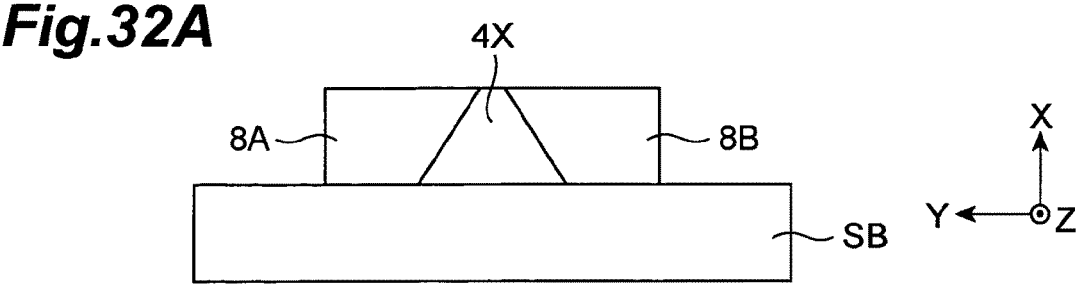
FIG. 32A is an XY cross-sectional diagram (along an A-A arrow) of a plasmon antenna intermediate, for explaining a plasmon antenna manufacturing method.
Figure 32B:
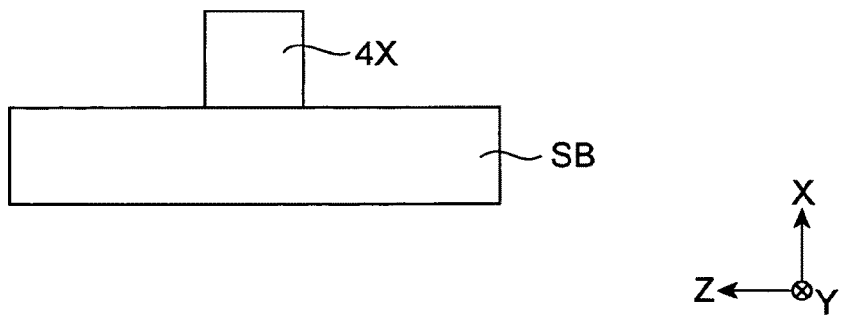
FIG. 32B is an XZ cross-sectional diagram (along a B-B arrow) of a plasmon antenna intermediate, for explaining a plasmon antenna manufacturing method.
Figure 32C:
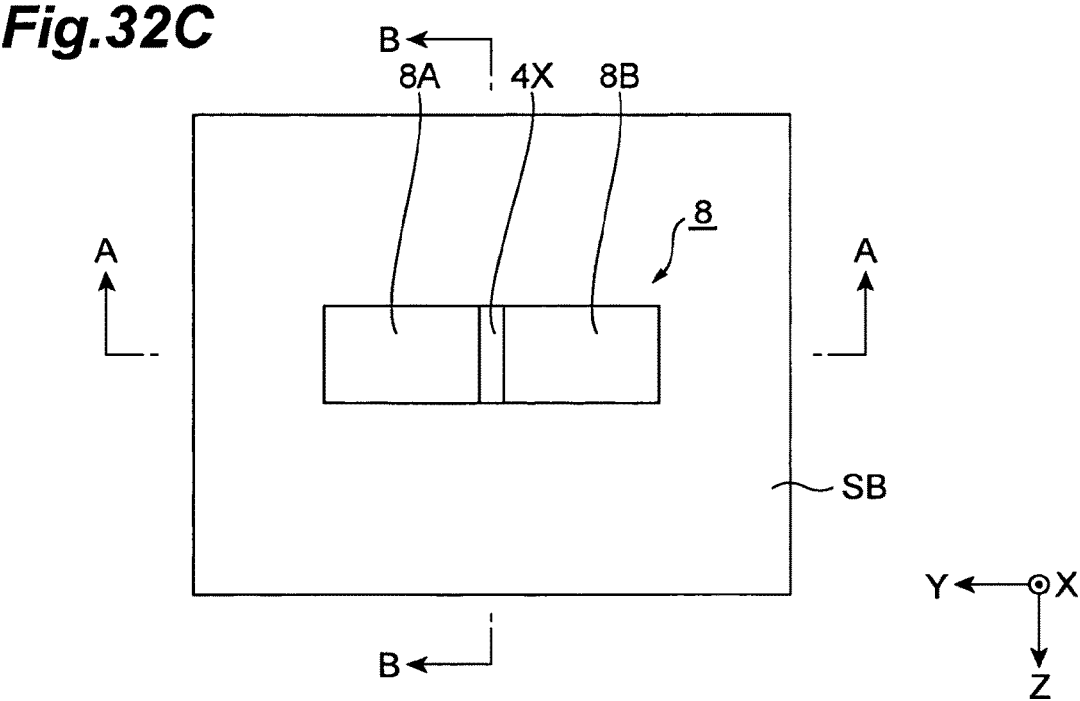
FIG. 32C is a plan-view diagram of an intermediate of a plasmon antenna, for explaining a plasmon antenna manufacturing method.

FIG. 32C is a plan-view diagram of a plasmon antenna intermediate; FIG. 32A is an XY cross-sectional diagram (along the A-A arrow) of the plasmon antenna intermediate; and FIG. 32B is an XZ cross-sectional diagram (along the B-B arrow) of the plasmon antenna intermediate.

Lastly, the plasmon antenna 8 illustrated in FIG. 6 is completed by removing the metal film and the insulating section 4X from positions in the periphery of the plasmon antenna 8, as viewed from the YZ plane, in such a way so as to yield desired dimensions of the small metal bodies 8A, 8B. The regions in which the above-described tester probes are connected are also removed.

The substrate SB comprises an insulator. The plasmon antenna 8 can be embedded in the core 4, comprising an optical waveguide material, by further depositing an optical waveguide material (tantalum oxide), on the substrate SB (see FIG. 5). A cladding of alumina or the like is formed then around the core 4. The magnetic poles 6A, 6B illustrated in FIG. 5 can be manufactured by forming respective magnetic materials (for example, a FeCoNi alloy) at corresponding regions in a process preceding or following the plasmon antenna 8 formation step. The periphery of the magnetic poles 6A, 6B is embedded in the materials of the core 4. These materials may also be a cladding material.

As described above, the plasmon antenna manufacturing method comprises the steps of (a) forming the insulating section 4X, comprising a protrusion made of an optical waveguide material, on the substrate SB (FIG. 28A); (b) covering the substrate SB and the insulating section 4X, comprising the protrusion, with the metal film 8 (FIG. 29A); and (c) forming the plasmon antenna 8 comprising the pair of small metal bodies 8A, 8B, by dividing the covering metal film 8 through flat lapping thereof until the insulating section 4X, comprising the protrusion, is exposed (FIG. 31A). When the magnetic pole 6B is thus formed above the protrusion, the corners CA, CB of the small metal bodies 8A, 8B can be disposed at positions that are closest to the magnetic pole 6B, as was the case above (FIG. 5).

Preferably, the lapping step is terminated before the shortest distance G1 between the pair of small metal bodies 8A, 8B formed by the divided metal film 8 is 15 nm or greater, more preferably before the shortest distance G1 is greater than 10 nm. This way the distance G1 of the above-described gap can measure less than 15 nm, or not more than 10 nm, which allows increasing near-field light intensity.

After the step of FIG. 29A to FIG. 29C, the same step of FIG. 26A to FIG. 26C may be carried out, leaving metal films 8A, 8B only on the left and right inclined surfaces of the insulating section 4X. Specifically, the metal film 8 is milled through collision of noble gas atoms such as Ar that strike the surface of the metal film 8 from a direction oblique to the YZ plane. The incidence angle of the noble gas is, for instance, 45 degrees. At this time, the direction in which the noble gas is jetted is kept fixed, and the substrate SB is rotated around the X-axis. The metal film 8 remains ultimately only on the left and right inclined surfaces LS, RS, to form small metal bodies 8A, 8B having a shape such as the one illustrated in FIG. 33.

This plasmon antenna manufacturing method comprises thus the steps of (a) forming the insulating section 4X, which makes up a protrusion that comprises an optical waveguide material, on the substrate SB (FIG. 28A); (b) covering the substrate SB and the insulating section 4X with the metal film 8 (FIG. 29A); and (c) forming the plasmon antenna comprising the pair of small metal bodies 8A, 8B, by dividing the metal film 8 through milling of the metal film 8 while rotating the substrate SB around the axis (X-axis) that runs along the thickness direction of the substrate SB. This method effectively simplifies manufacture of the plasmon antenna.

In the above embodiment, the two small metal bodies 8A, 8B that make up the plasmon antenna 8 have both a trapezoidal shape. The shape of the small metal bodies 8A, 8B, however, may be triangular or some other shape.

Figure 33:
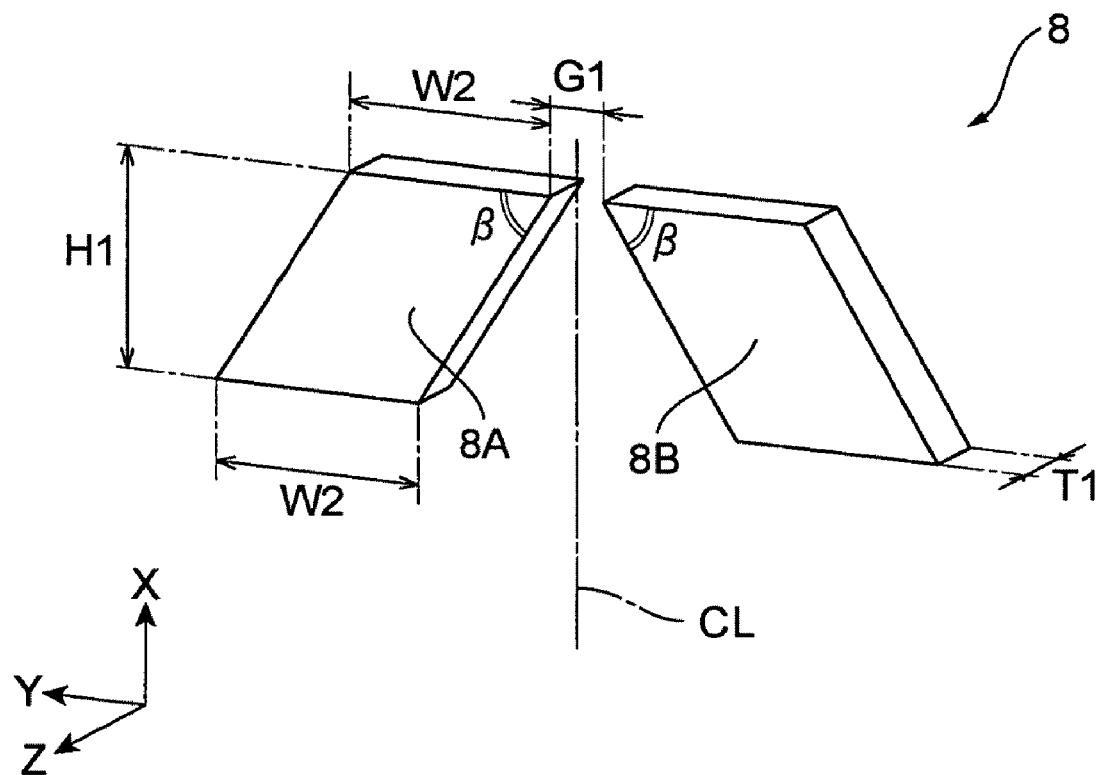
FIG. 33 is a perspective-view diagram of a plasmon antenna according to a second embodiment.

FIG. 33 is a perspective-view diagram of a plasmon antenna 8 according to a second embodiment.

The plasmon antenna 8 of the second embodiment differs from the plasmon antenna 8 of the first embodiment in that now the plan-view shape of the small metal bodies is a parallelogram, as viewed from the Z-axis, such that the dimension W2, in the Y-axis direction, of the upper base of the trapezoidal plan-view shape of the small metal bodies is identical to the dimension W2 of the lower base, the structure of the plasmon antenna 8 in the second embodiment being otherwise the same as that of the first embodiment. The plasmon antenna 8 having such a structure functions in the same way as the plasmon antenna 8 in the first embodiment. The sides (W2) of the respective parallelograms form each one side of the respective corners that give the distance G1.

Figure 34:
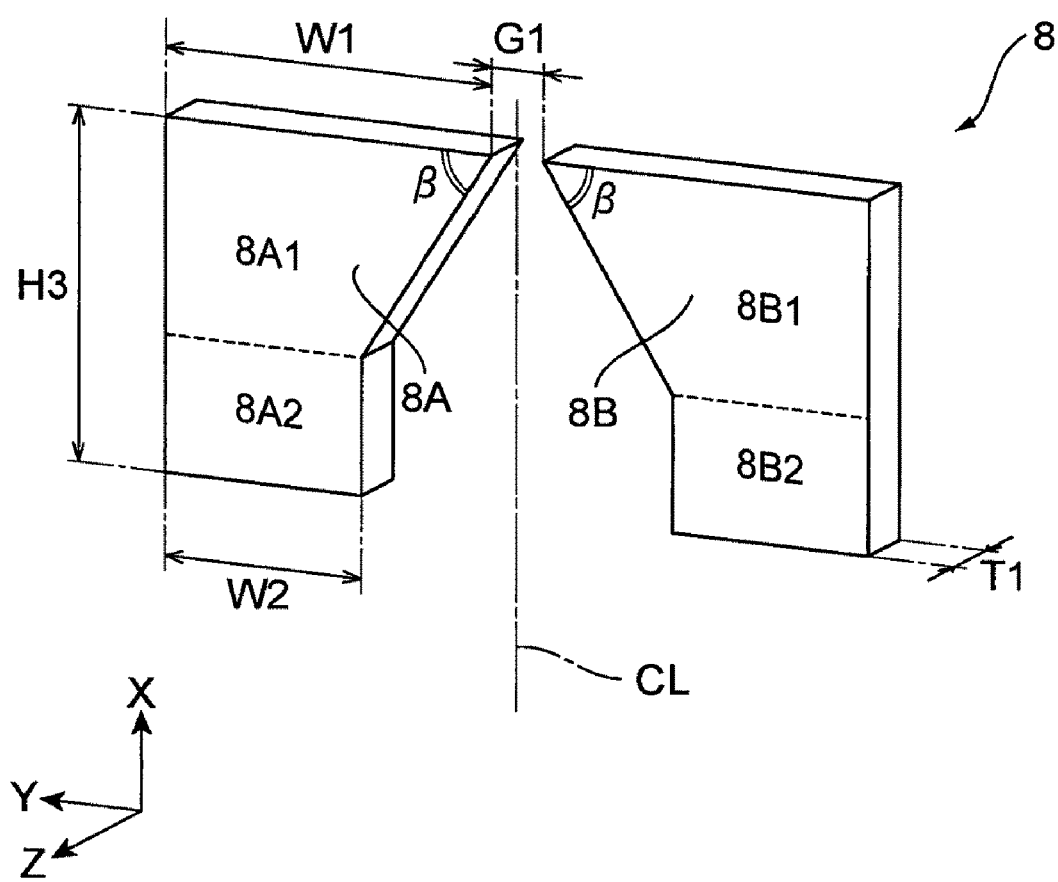
FIG. 34 is a perspective-view diagram of a plasmon antenna according to a third embodiment.

FIG. 34 is a perspective-view diagram of a plasmon antenna according to a third embodiment.

The plasmon antenna 8 of the third embodiment differs from the plasmon antenna 8 of the first embodiment in that now the plasmon antenna 8 of the first embodiment constitutes the small metal body main sections 8A1, 8B1 illustrated in FIG. 34, under which there are contiguously formed metal body extensions 8A2, 8B2, in the lower portion of FIG. 34. The dimension of the metal body extensions 8A2, 8B2 in the Y-axis direction is W2. The height H3 of the small metal bodies 8A, 8B is slightly larger than the height of the small metal bodies 8A, 8B of the first embodiment. Otherwise, the structure of the plasmon antenna is identical to that of the first embodiment.

In the plasmon antenna according to the present embodiment, thus, the small metal bodies 8A, 8B comprise respectively the small metal body main sections 8A1, 8B1 and the metal body extensions 8A2, 8B2 contiguous to the metal body main sections 8A1, 8B1. The plan-view shape of the small metal body main sections 8A1, 8B1, viewed from the Z-axis direction, is trapezoidal, while the shape of the metal body extensions 8A2, 8B2, as viewed from the Z-axis direction, is rectangular. The upper bases (W1) of the respective trapezoids form each one side of the respective corners that give the distance G1. Also, one side in the metal body extensions 8A2, 8B2 is contiguous to the metal body main sections 8A1, 8B1, the boundary therebetween being the lower base of the trapezoid.

The plasmon antenna 8 having such a structure functions in the same way as the plasmon antenna 8 in the first embodiment. To manufacture such a structure, the metal body extensions 8A2, 8B2 may be manufactured first, followed by manufacture of the plasmon antenna of the first embodiment described above.

When the plan-view shape of the small metal bodies 8A, 8B, as viewed from the Z-axis direction, is a plan-view shape in which the sides positioned on the side of the magnetic poles extend linearly, for instance as in the various above-described embodiments, in which the plan-view shape is a trapezoid (FIG. 6), a parallelogram (FIG. 33), or shape in which a rectangle is joined to a trapezoid (FIG. 34), the small metal bodies can be brought closer to the magnetic poles than is the case in the plasmon antenna of the above-described U.S. Pat. No. 6,649,894. Sufficient write magnetic field can thus be applied before the magnetic recording medium cools down, as a result of which data can be written with high precision.

What is claimed is:

1. A plasmon antenna for a thermally assisted magnetic head, comprising:
   a medium-facing surface, set parallel to an XY plane;
   a magnetic pole for writing, extending toward the medium-facing surface; and
   a plasmon antenna comprising a pair of small metal bodies irradiated with excitation light for near-field light generation propagating in a Z-axis direction,
   wherein
   each of the small metal bodies is spaced from the magnetic pole in an X-axis direction, the magnetic pole is not positioned between the small metal bodies, respective corners of the small metal bodies are spaced apart opposite each other along a track width direction of a magnetic recording medium, a distance G1 between the corners gives a shortest distance between the small metal bodies, and a distance D from each corner to a leading end of the magnetic pole gives a shortest distance from the small metal bodies to the leading end.

2. The plasmon antenna according to claim 1, wherein the track width direction is a direction of the TE mode of the excitation light.

3. The plasmon antenna according to claim 1, wherein distance D is 5 nm to 300 nm.

4. The plasmon antenna according to claim 1, wherein the plan-view shape of each small metal body, as viewed from the Z-axis direction, is a trapezoid.

5. The plasmon antenna according to claim 4, wherein each upper base of the respective trapezoids forms one side of the corners that give the distance G1.

6. The plasmon antenna according to claim 1, wherein the plan-view shape of each small metal body, as viewed from the Z-axis direction, is a parallelogram.

7. The plasmon antenna according to claim 6, wherein one side of the parallelogram forms one side of the corners that give the distance G1.

8. The plasmon antenna according to claim 1, wherein each small metal body comprises: a small metal body main section; and a metal body extension that is contiguous to the small metal body main section, the plan-view shape of each the small metal body main section, as viewed from the Z-axis direction, is a trapezoid, and the plan-view shape of each small metal body extension, as viewed from the Z-axis direction, is a rectangle.

9. The plasmon antenna according to claim 8, wherein each upper base of the respective trapezoids forms one side of the corners that give the distance G1, and one side in the metal body extension is contiguous to the metal body main section, the boundary therebetween being the lower base of the trapezoid.

10. The plasmon antenna according to claim 1, wherein the dimension of each small metal body alongside the corners in the Y-axis is larger than a predefined value.

11. The plasmon antenna according to claim 1, wherein the distance G1 between the small metal bodies is smaller than 15 nm.

12. The plasmon antenna according to claim 1, wherein the distance G1 between the small metal bodies is not greater than 10 nm.

13. The plasmon antenna according to claim 1, wherein the small metal bodies comprise Au or Ag.

14. A thermally assisted magnetic head, comprising:
the plasmon antenna and the magnetic pole according to claim 1;
a coil for causing magnetic flux to pass through the magnetic pole; and
a core through which the excitation light propagates.

15. The thermally assisted magnetic head according to claim 14, further comprising a magnetoresistance effect element disposed at a position such that the corners are flanked by the magnetoresistance effect element and the magnetic pole.

16. A hard disk drive, comprising:
a head gimbal assembly on which the thermally assisted magnetic head according to claim 15 is mounted; and
a magnetic recording medium opposing the thermally assisted magnetic head.

17. A method for manufacturing the plasmon antenna of claim 1, comprising the steps of:
(a) forming a protrusion formed of a waveguide material, on a substrate;
(b) covering the substrate and the protrusion with a metal film; and
(c) forming a plasmon antenna comprising a pair of small metal bodies, by separating the covering metal film by flat lapping the metal film until the protrusion is exposed.

18. The method for manufacturing according to claim 17, wherein the lapping step is terminated before a shortest distance between the pair of small metal bodies becomes 15 nm or greater.

19. The method for manufacturing according to claim 17, wherein the lapping step is terminated before a shortest distance between the pair of small metal bodies becomes greater than 10 nm.

20. A method for manufacturing the plasmon antenna claim 1, comprising the steps of:
(a) forming a protrusion formed of a waveguide material on a substrate;
(b) covering the substrate and the protrusion with a metal film; and
(c) forming a plasmon antenna comprising a pair of small metal bodies, by dividing the covering metal film through milling the metal film while rotating the substrate around an axis that runs along the thickness direction of the substrate.

21. The method for manufacturing according to claim 20, wherein the lapping step is terminated before a shortest distance between the pair of small metal bodies becomes 15 nm or greater.

22. The method for manufacturing according to claim 20, wherein the lapping step is terminated before a shortest distance between the pair of small metal bodies becomes greater than 10 nm.

* * * * *